(12) United States Patent
August

(10) Patent No.: US 10,611,079 B2
(45) Date of Patent: Apr. 7, 2020

(54) QUADRILATERAL SPARSE INFILL MADE OF LINEAR SEGMENTS OF FILAMENT

(71) Applicant: Arevo, Inc., Santa Clara, CA (US)

(72) Inventor: Zachary Aaron August, Santa Clara, CA (US)

(73) Assignee: Arevo, Inc., Milpitas, CA (US)

( * ) Notice: Subject to any disclaimer, the term of this patent is extended or adjusted under 35 U.S.C. 154(b) by 161 days.

(21) Appl. No.: 15/899,360

(22) Filed: Feb. 19, 2018

(65) Prior Publication Data

US 2019/0255764 A1    Aug. 22, 2019

(51) Int. Cl.
  *B29C 64/118* (2017.01)
  *B33Y 80/00* (2015.01)
  (Continued)

(52) U.S. Cl.
  CPC ............ *B29C 64/118* (2017.08); *B33Y 10/00* (2014.12); *B33Y 70/00* (2014.12); *B33Y 80/00* (2014.12);
  (Continued)

(58) Field of Classification Search
  CPC ....... B32B 2607/00; B32B 3/12; B32B 27/08; B32B 13/12; B32B 2305/024; B32B 2307/3065; B32B 2307/722; B32B 1/00; B32B 2255/26; B32B 2266/0278; B32B 2305/022; B32B 2355/02; B32B 2375/00; B32B 2553/02; B32B 27/065; B32B 27/302; B32B 27/304; B32B 27/32; B32B 27/40; B32B 37/146; B32B 38/04; B32B 38/08; B32B 3/26; B32B 3/30; B32B 5/18; B32B 7/04; B32B 7/08; B32B 27/146; B32B 28/04; B32B 28/08; B27B 27/065; B27B 27/302; B27B 27/32; B27B 27/40; B29C 67/0055
  USPC ........ 264/308; 428/116, 117, 178, 131, 137, 428/179, 180, 188, 223, 99, 156, 166, 428/167, 184, 198, 308.4, 319.1, 44, 516, 428/542.8, 71, 119, 132, 138, 142, 143, 428/159, 172, 174, 181, 194, 207, 212, 428/220, 309.9, 317.3, 319.9, 35.5, 364,
  (Continued)

(56) References Cited

U.S. PATENT DOCUMENTS 9,475,233 B2   10/2016   Schmehl
2016/0067928 A1  3/2016   Mark et al.
(Continued)

OTHER PUBLICATIONS

Definition of linear, https://www.collinsdictionary.com/us/dictionary/english/linear; last accessed Jul. 23, 2018 (Year: 2018).*
(Continued)

*Primary Examiner* — Camie S Thompson
(74) *Attorney, Agent, or Firm* — McGeary Cukor LLC; Jason Paul DeMont; Kenneth Ottesen

(57) ABSTRACT

An article of manufacture is disclosed that comprises an infill made from linear segments of filament, such as but not limited to continuous carbon fiber-reinforced thermoplastic filament. Embodiments of the present invention comprises segments of filament in various geometries that distribute where adjacent segments overlap and are fused and where segments do not overlap. Embodiments of the present invention include quadrilateral (e.g., orthogonal, rectangular, etc.) infill and hexagonal (e.g., regular hexagonal, irregular hexagonal, convex hexagonal, etc.) infill.

20 Claims, 34 Drawing Sheets

(51) Int. Cl.
 *B33Y 10/00* (2015.01)
 *B33Y 70/00* (2020.01)
 *B29K 307/04* (2006.01)
 *B29K 105/08* (2006.01)
(52) U.S. Cl.
 CPC ...... *B29K 2105/08* (2013.01); *B29K 2307/04* (2013.01)
(58) Field of Classification Search
 USPC ........ 428/36.9, 372, 474.4, 475.5, 489, 500, 428/523, 542.2, 58, 592, 60, 605, 688, 428/703, 72, 76
 See application file for complete search history.

(56) References Cited

U.S. PATENT DOCUMENTS

2016/0346999 A1* 12/2016 Patrov ................. B29C 67/0055
2017/0217088 A1* 8/2017 Boyd, IV ............ B29C 67/0055

OTHER PUBLICATIONS

Henshaw, Steve, "How to Choose an Infill for Your 3D Prints," https://3dprinting.com/tips-tricks/how-to-choose-an-infill-for-your-3d-prints/, Sep. 16, 2015.
Smythe, Chris, "Infill and Strength: Functional Design Doesn't Stop at the CAD Desk," http://3dprintingforbeginners.com/infill-strength/, Date of Publication unknown but no later than Apr. 21, 2015 (the date of the first comment).
Hodgson, Gary; Ranellucci, Allesandro, and Moe, Jeff, "Slic3r Manual: Infill Patterns and Density," http://manual.slic3r.org/expert-mode/infill, Date of Publication unknown.
Office action, U.S. Appl. No. 15/899,361, dated Nov. 2, 2018.

* cited by examiner

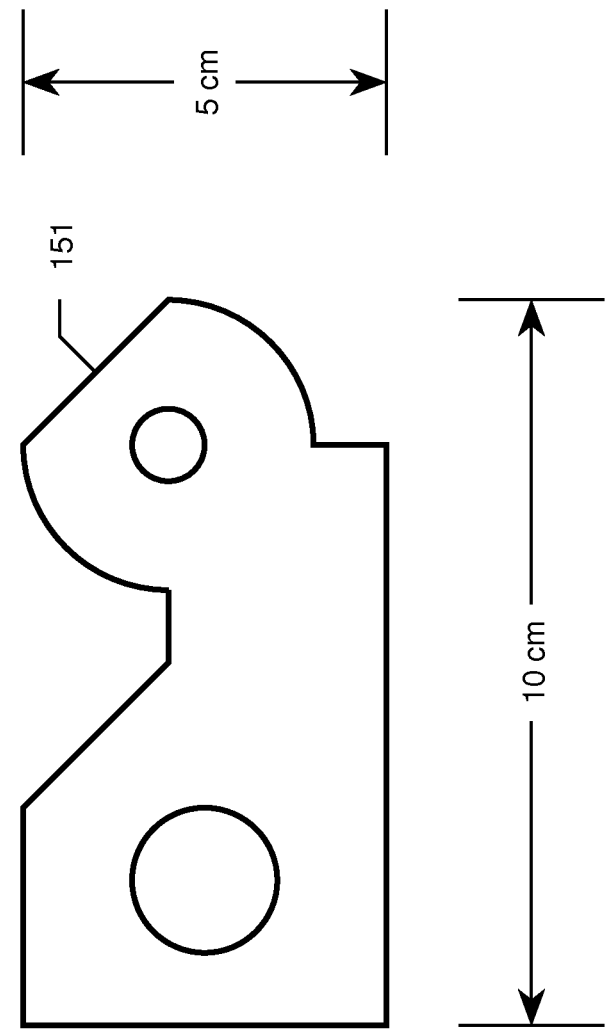
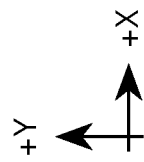
Figure 3a

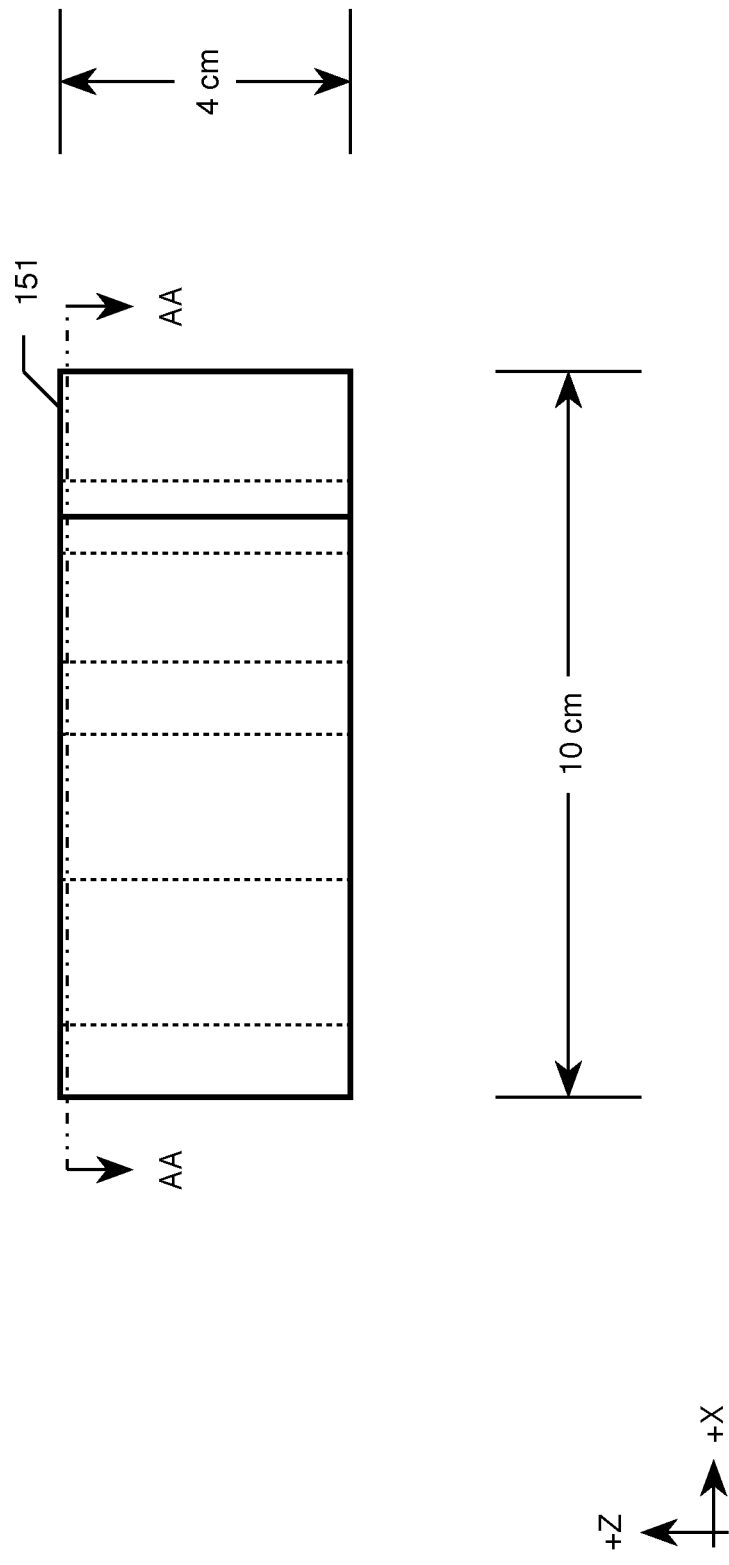

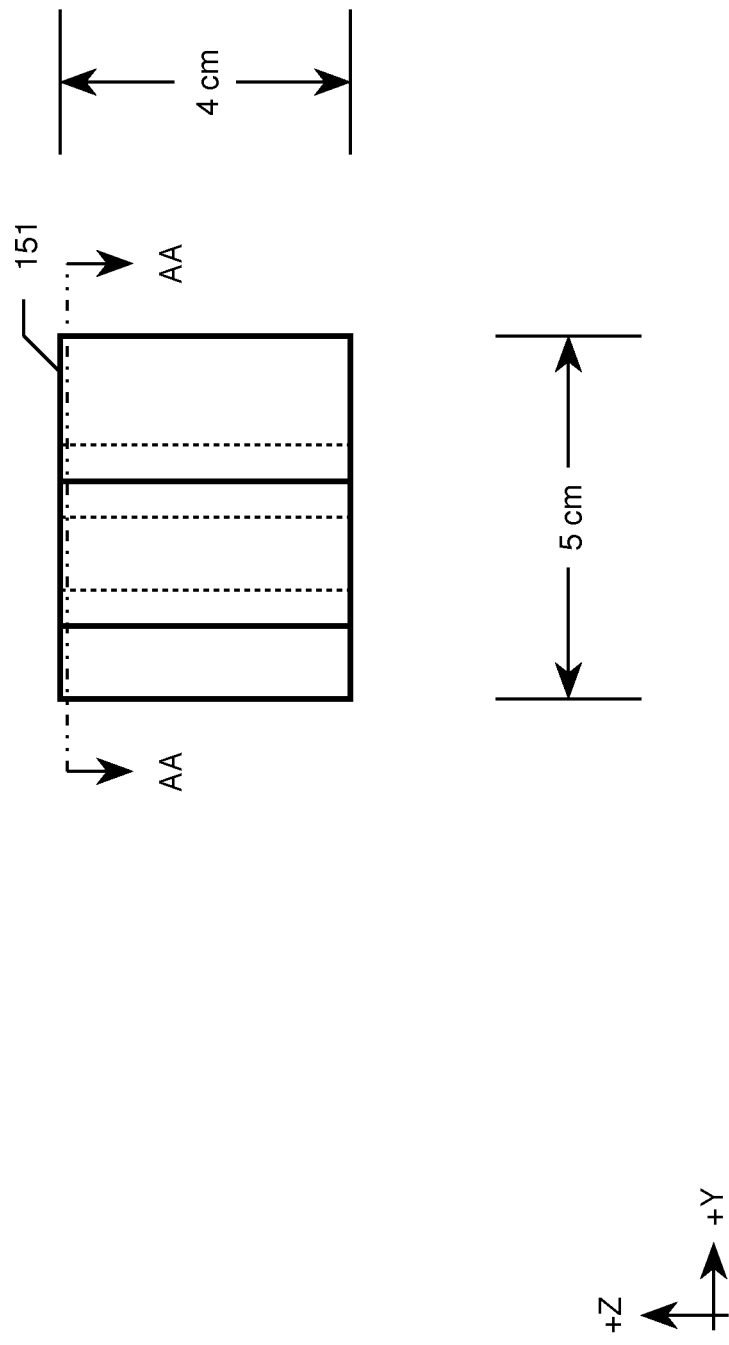

Quadrilateral Infill Archetype
(Orthographic Top View)

Hexagonal Infill Archetype
(Orthographic Top View)

Fully-Custom Quadrilateral Infill for Article 151
(Orthographic Top View at Cross-Section AA-AA)

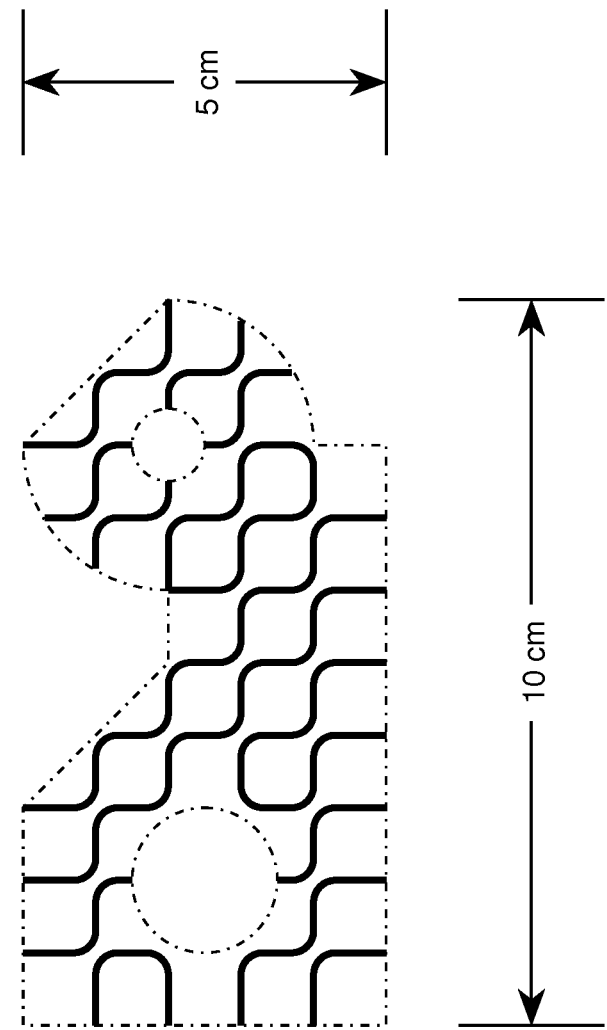
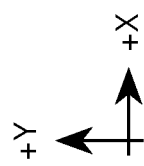
Figure 19

Hexagonal Infill Archetype in Detail
(Orthographic Top View)

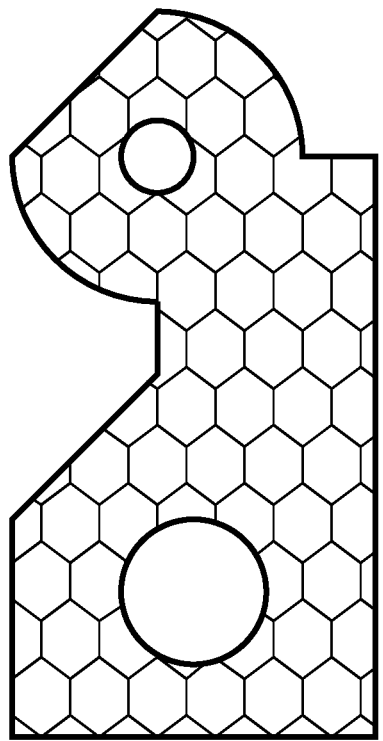
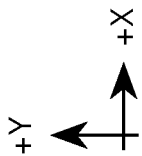
Figure 28 — Fully-Custom Hexagonal Infill for Article 151 (Orthographic Top View at Cross-Section AA-AA)

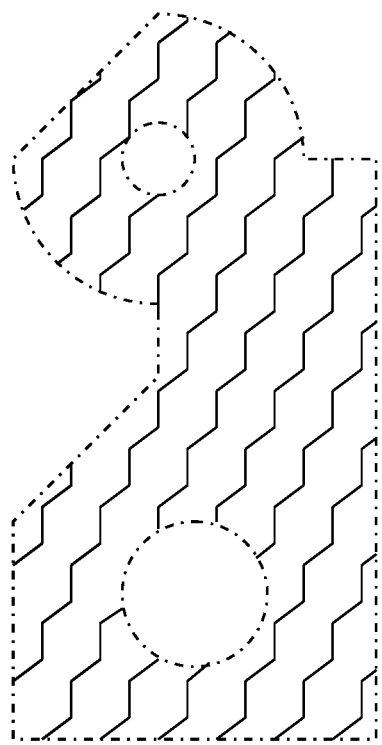
Fully-Custom Hexagonal Infill Layer "E" for Article 151
(Orthographic Top View)
Figure 29
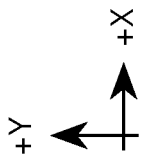

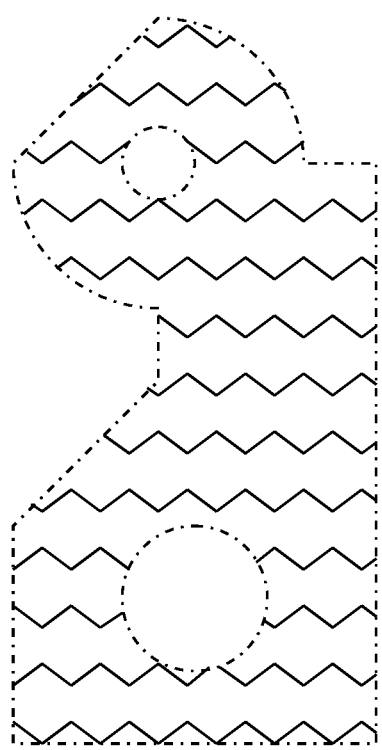
Fully-Custom Hexagonal Infill Layer "F" for Article 151
(Orthographic Top View)
Figure 30
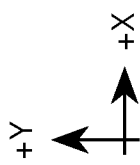

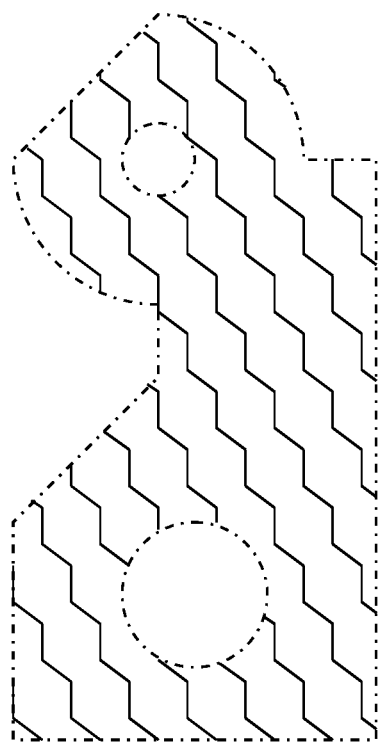
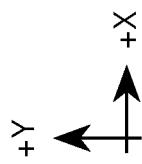
Figure 31
Fully-Custom Hexagonal Infill Layer "G" for Article 151
(Orthographic Top View)

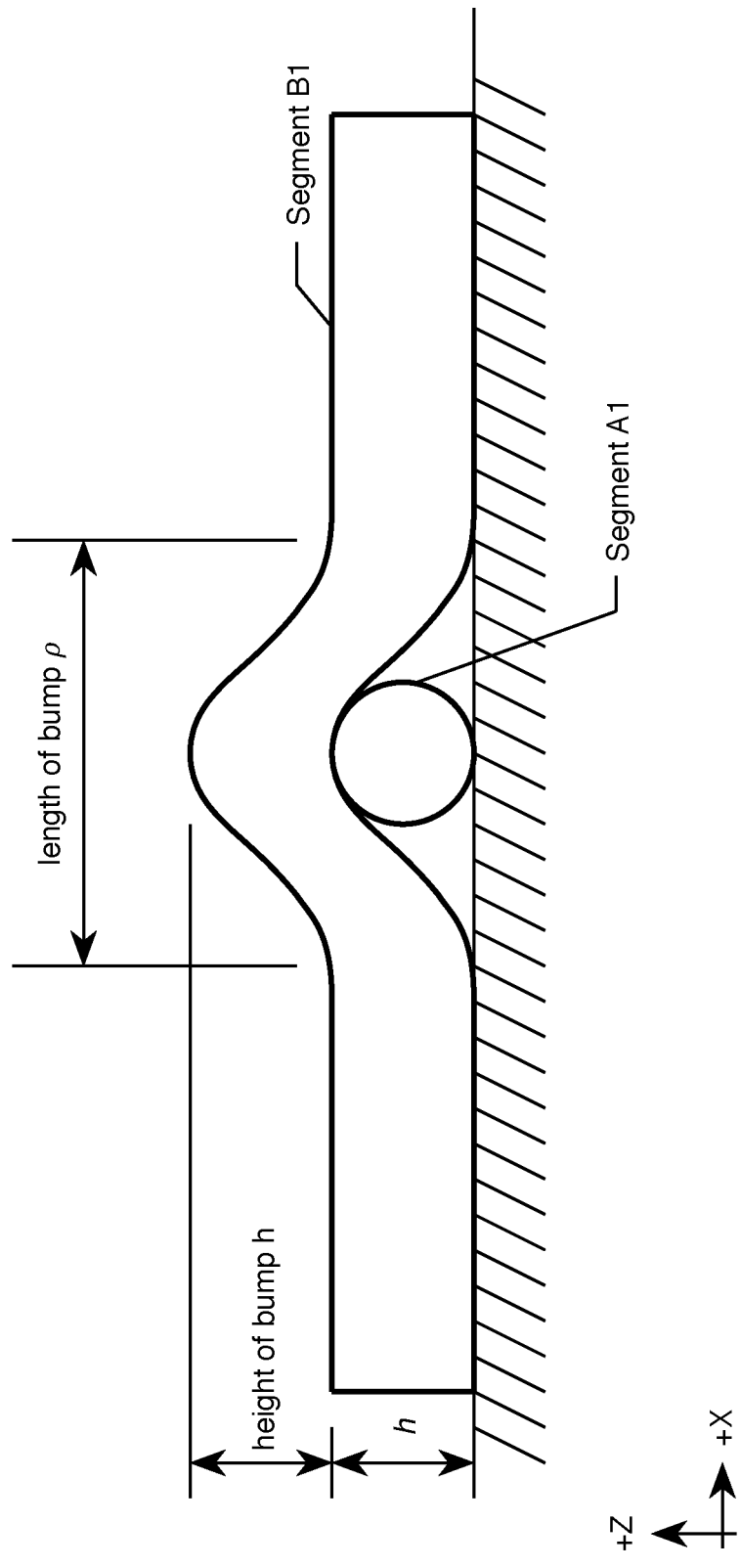
Figure 32  Illustration of "Bump" or Deviation Caused By the Overlapping of Segments
(Orthographic Front View)

QUADRILATERAL SPARSE INFILL MADE OF LINEAR SEGMENTS OF FILAMENT

STATEMENT OF RELATED APPLICATIONS

This application is related to co-pending U.S. patent application Ser. No. 15/899,361, entitled "Hexagonal Sparse Infill Made of Linear Segments of Filament,".

FIELD OF THE INVENTION

The present invention relates to additive manufacturing of three-dimensional articles in general, and, more particularly, to a technique for fabricating articles of manufacture that comprise a sparse infill.

BACKGROUND

In general, there are two complementary approaches to fabricate an article of manufacture: additive manufacturing and subtractive manufacturing.

Additive manufacturing involves aggregating material to form the desired article of manufacture. In contrast, subtractive manufacturing involves removing material to form the desired article of manufacture. In practice, many article of manufactures are fabricated using a combination of additive and subtractive techniques.

A form of additive manufacturing colloquially known as "3D printing"—is the subject of intense research and development because it enables the fabrication of articles of manufacture with complex geometries without molds or dies. Furthermore, 3D printing enables the mass customization of articles of manufacture with different dimensions and characteristics. There remain, however, many challenges in the design, manufacture, and use of 3D printers.

SUMMARY OF THE INVENTION

Consider the task of designing an article to be crush-resistant but lightweight. An article of a given material, a given external geometry, and a solid interior is typically more crush-resistant than an article with a hollow interior. In contrast, an article of a given material, a given external geometry, and a hollow interior is typically lighter than an article with a solid interior.

There are, however, more options for the interior and one such option is a sparse infill. A sparse infill (herein also called an "infill") is a porous or skeletal or cellular structure that is stronger than a hollow interior and lighter in weight than a solid interior.

Infills are commonly incorporated into articles that are 3D printed, and it is well-known how to make an infill using a 3D printing technology in which the structural integrity of the infill is independent of the macroscopic properties of the materials used to make the structure. For example, the structural integrity of an infill made of acrylonitrile butadiene styrene (ABS) is independent of how the plastic is cut up and assembled. It is well-known in the prior art how to make an infill using ABS with fused-deposition modeling ("FDM").

In contrast, the structural integrity of the infill is dependent on the macroscopic properties of some materials. For example, the structural integrity of an infill made of fiber-reinforced thermoplastic filament is dependent on how the filament is cut up and assembled. In general, the structural advantage a fiber-reinforced filament is diminished when the filament is cut, and, therefore, cuts are to be avoided when possible.

This leads to a difficulty that is illustrated in FIG. 32. When the first segment of filament (e.g., segment B1) is deposited over a portion of a second segment of filament (e.g., segment A1), a "bump" or deviation can result in the path of a first segment. In real-world-scale infills, which can comprise thousands of bumps, the bumps can cause unevenness in the infill and structural weakness.

For some materials, such as ABS plastic, the bump in FIG. 32 can be averted by cutting out a segment of the first filament at the second segment and by fusing the first and segments together. But for other materials, the mere act of cutting the filament irreparably weakens the material, and fusing the various segments does not fix the problem.

Embodiments of the present invention enable an article with an infill to be fabricated with filament without some of the costs and disadvantages for doing so in the prior art. For example, some embodiments of the present invention deposit segments of filament in shapes and locations so that the number of bumps is reduced. Furthermore, some embodiments of the present invention deposit segments of filament in shapes and locations so that the harmful effects of the remaining bumps is fully or partially eliminated. In general, this is achieved by depositing the segments of filament in shapes and locations in such a way that the locations where the segments overlap and do not overlap is carefully distributed.

Embodiments of the present invention are described in detail that enable the fabrication of quadrilateral (e.g., orthogonal, rectangular, rhomboidal, trapezoidal, etc.) infill. Furthermore, embodiments of the present invention are described in detail that enable the fabrication of hexagonal (e.g., regular hexagonal, irregular hexagonal, convex hexagonal, etc.) infill.

BRIEF DESCRIPTION OF THE DRAWINGS

FIG. 3a depicts an orthographic top view of the salient characteristics of article 151 in accordance with the illustrative embodiments.

FIG. 3b depicts an orthographic front view of the salient characteristics of article 151 in accordance with the illustrative embodiments.

FIG. 3c depicts an orthographic side view of the salient characteristics of article 151 in accordance with the illustrative embodiments.

FIG. 19 depicts an orthographic top view of the segments in a Layer D layer in the fully-custom infill of article 151 in accordance with the first illustrative embodiment.

FIG. 28 depicts an orthographic top view of the fully-custom infill of article 151 at cross-section AA-AA in accordance with the second illustrative embodiment, which is the top of layer L=200.

FIG. 29 depicts an orthographic top view of the segments in a Layer E layer in the fully-custom infill of article 151 in accordance with the second illustrative embodiment.

FIG. 30 depicts an orthographic top view of the segments in a Layer F layer in the fully-custom infill of article 151 in accordance with the second illustrative embodiment.

FIG. 31 depicts an orthographic top view of the segments in a Layer G layer in the fully-custom infill of article 151 in accordance with the second illustrative embodiment.

FIG. 32 depicts an orthographic front view of the length of bump p, which results when a first segment (e.g., segment B1) is deposited and intersects a second segment (e.g., segment B1).

DETAILED DESCRIPTION

Figure 1:
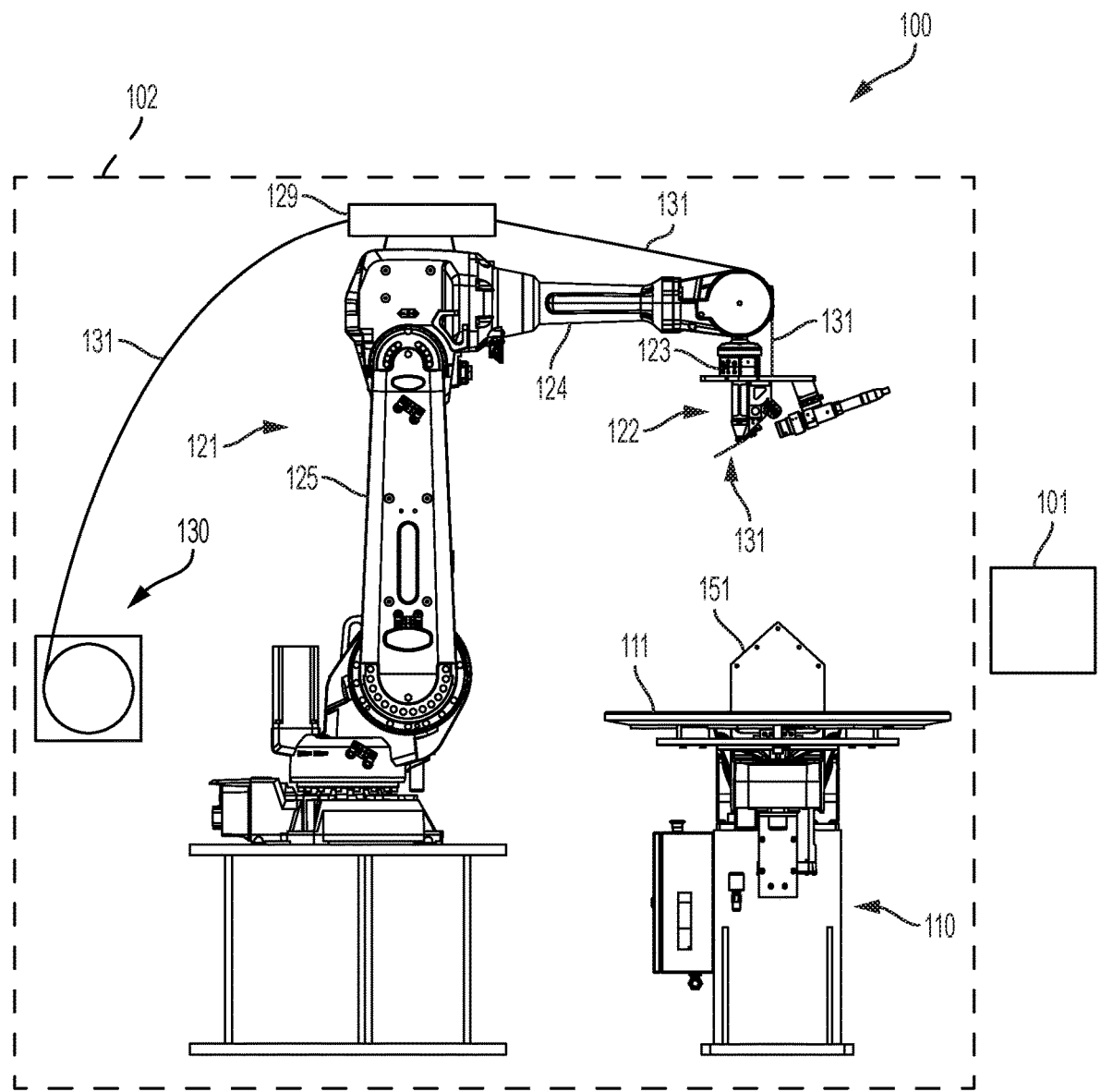
FIG. 1 depicts an illustration of the salient components of additive manufacturing system 100 in accordance with the illustrative embodiments of the present invention.

FIG. 1 depicts an illustration of the salient components of additive manufacturing system 100 in accordance with the illustrative embodiments of the present invention. Additive manufacturing system 100 comprises: controller 101, build chamber 102, turntable 110, deposition build plate 111, robot 121, deposition head 122, filament conditioning unit 129, filament source 130, and thermoplastic filament 131. The purpose of manufacturing system 100 is to fabricate article of manufacture 151 (hereinafter "article 151").

Controller 101 comprises the hardware and software necessary to direct build chamber 102, robot 121, deposition head 122, and turntable 110, in order to fabricate article 151. It will be clear to those skilled in the art how to make and use controller 101.

Build chamber 102 is a thermally-insulated, temperature-controlled environment in which article 151 is fabricated. It will be clear to those skilled in art how to make and use build chamber 102.

Turntable 110 comprises a stepper motor under the control of controller 101 that is capable of rotating build plate 111 (and, consequently article 151) around the Z-axis (i.e., orthogonal to the build plate). In particular, turntable 110 is capable of:

i. rotating build plate 111 clockwise around the Z-axis from any angle to any angle, and
  ii. rotating build plate 111 counter-clockwise around the Z-axis from any angle to any angle, and
  iii. rotating build plate 111 at any rate, and
  iv. maintaining (statically) the position of build plate 111 at any angle.

It will be clear to those skilled in the art how to make and use turntable 110.

Build plate 111 is a platform comprising hardware on which article 151 is fabricated. Build plate 111 is configured to receive heated filament deposited by deposition head 122. It will be clear to those skilled in the art how to make and use build plate 111.

Robot 121 is capable of depositing a segment of fiber-reinforced thermoplastic filament from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm that is under the control of controller 101. The mechanical arm comprises first arm segment 123, second arm segment 124, and third arm segment 125. The joints between adjoining arm segments are under the control of controller 101. A non-limiting example of robot 121 is the IRB 4600 robot offered by ABB. It will be clear to those skilled in the art how to make and use robot 121.

The mechanical arm of robot 121 can move deposition head 122 in:

i. the +X direction,
  ii. the −X direction, iii. the +Y direction,
iv. the −Y direction,
v. the +Z direction,
vi. the −Z direction, and
vii. any combination of i, ii, iii, iv, v, and vi, while rotating the approach angle of deposition head 122 around any point or temporal series of points. It will be clear to those skilled in the art how to make and use robot 121.

Deposition head 122 comprises hardware that is under the control of controller 101 and that deposits fiber-reinforced thermoplastic filament 131. Deposition head 122 is described in detail in pending United States patent applications:
  (i) Ser. No. 15/827,721, entitled "Filament Guide," filed on Nov. 30, 2017;
  (ii) Ser. No. 15/827,711, entitled "Filament Heating in 3D Printing Systems," filed on Nov. 30, 2017;
  (iii) Ser. No. 15/854,673, entitled "Alleviating Torsional Forces on Fiber-Reinforced Thermoplastic Filament," filed on Dec. 26, 2017;
  (iv) Ser. No. 15/854,676, entitled "Depositing Arced Portions of Fiber-Reinforced Thermoplastic Filament," filed Dec. 26, 2017;

all of which are incorporated by reference for the purpose of describing additive manufacturing system 100 in general, and deposition head 122 in particular.

Filament conditioning unit 129 comprises hardware that pre-heats filament 131 prior to deposition. It will be clear to those skilled in the art how to make and use filament conditioning unit 129.

Filament 131 comprises a tow of reinforcing fibers that is substantially parallel to its longitudinal axis. In accordance with the illustrative embodiments, filament 131 comprises a cylindrical towpreg of contiguous 12K carbon fiber that is impregnated with thermoplastic resin. Thermoplastic filament 131 comprises contiguous carbon fiber, but it will be clear to those skilled in the art, after reading this disclosure, how to make and use alternative embodiments of the present invention in which thermoplastic filament 131 has a different fiber composition.

It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiment of the present invention, the filament comprises a metal. For example, and without limitation, the filament can be a wire comprising stainless steel, Inconel® (nickel/chrome), titanium, aluminum, cobalt chrome, copper, bronze, iron, precious metals (e.g., platinum, gold, silver, etc.).

Figure 2:
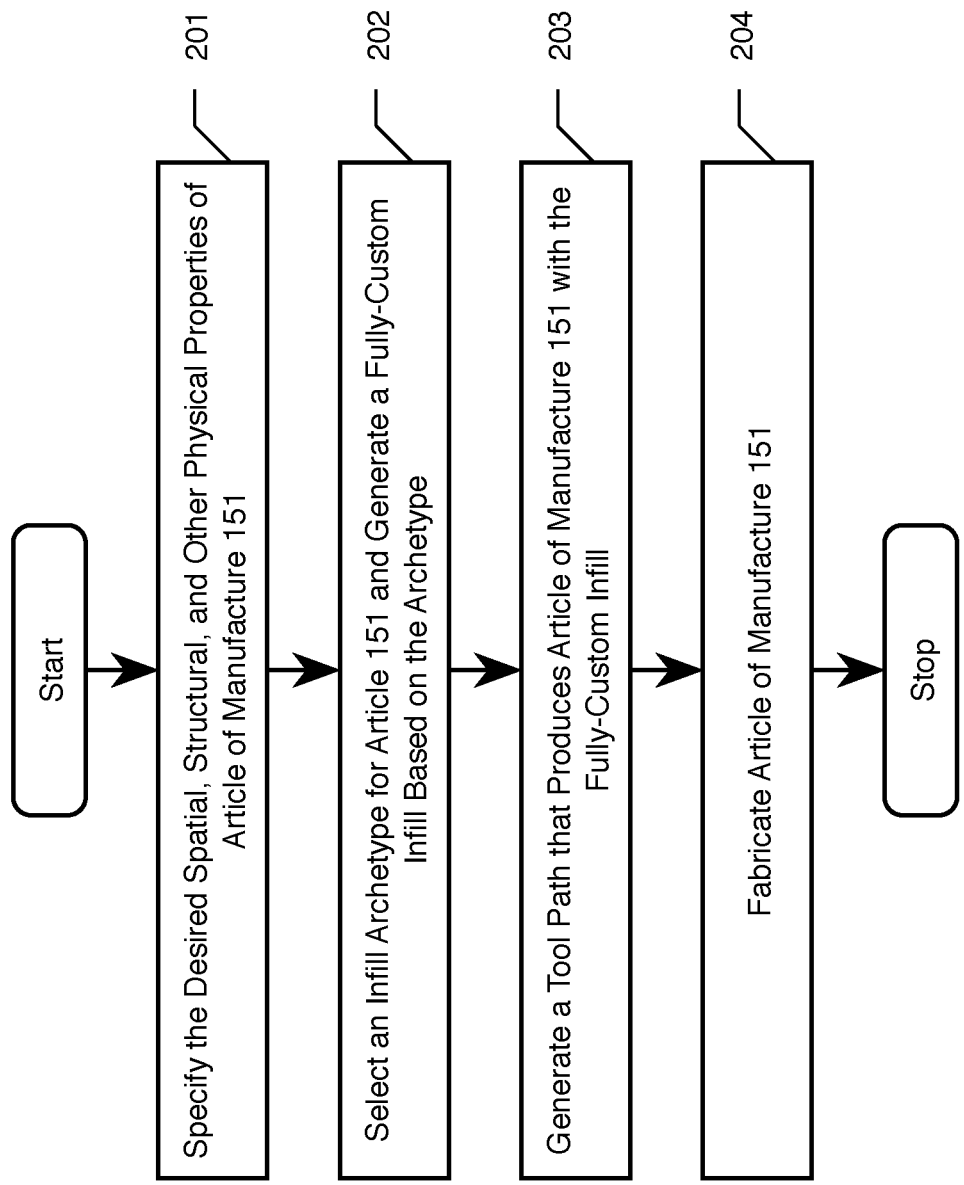
FIG. 2 depicts a flowchart of the salient tasks that are performed in accordance with the illustrative embodiments of the present invention.

FIG. 2 depicts a flowchart of the salient tasks that are performed in accordance with the illustrative embodiments of the present invention.

At task 201, a human designer uses a computer-aided-design system (e.g., Dassault Systernes Solid Works®, etc.) to specify the desired spatial, structural, and other physical properties of article of manufacture 151 (hereinafter "article 151"). The salient spatial features of article 151 are depicted in FIGS. 3a, 3b, and 3c. In accordance with the illustrative embodiments, article 151 is 10 cm. wide by 5 cm. long by 4 cm. deep. It will be clear to those skilled in the art, after reading this disclosure, how to make and use alternative embodiments of the present invention that have any width, any length, and any depth.

In accordance with the illustrative embodiments, article 151 comprises two orifices. It will be clear to those skilled in the art, after reading this disclosure, how to make and use alternative embodiments of the present invention that have any number of orifices (e.g., zero orifices, one orifice, three orifices, four orifices, etc.).

In accordance with the illustrative embodiment, article 151 comprises cylindrical orifices, but it will be clear to those skilled in the art, after reading this disclosure, how to make and use alternative embodiments of the present invention in which the orifices have any geometry (e.g., cubic, conic, prismatic, pyramidical, irregular, etc.).

In accordance with the illustrative embodiments, the exterior surfaces of article 151 comprise planar and cylindrical surfaces. It will be clear to those skilled in the art, after reading this disclosure, how to make and use alternative embodiments of the present invention that comprises exterior surfaces of any contour (e.g., planar, spherical cylindrical, conical, elliptical, pyramidical, irregular, etc.).

In accordance with the illustrative embodiments, article 151 is neither solid nor hollow. Instead, article 151 comprises a combination of air and a lattice- or honeycomb-like geometric structure known as an infill. Article 151 with the infill is lighter and less costly to fabricate than if the article were solid and stronger than if the article were hollow.

In accordance with the illustrative embodiments, all of article 151 both the exterior shell and the infill is fabricated from fiber-reinforced thermoplastic filament, but it will be clear to those skilled in the art, after reading this disclosure, how to make and use alternative embodiments of the present invention in which some parts are made of one or more materials but other parts of made of different materials.

It will be clear to those skilled in the art how to perform task 201.

At task 202, the human designer and computer-aided-design system:
(i) select an infill archetype for article 151, and
(ii) generate a fully-custom infill based on the selected infill archetype for article 151 that satisfies the structural and other physical properties specified in task 201.

Figure 4:
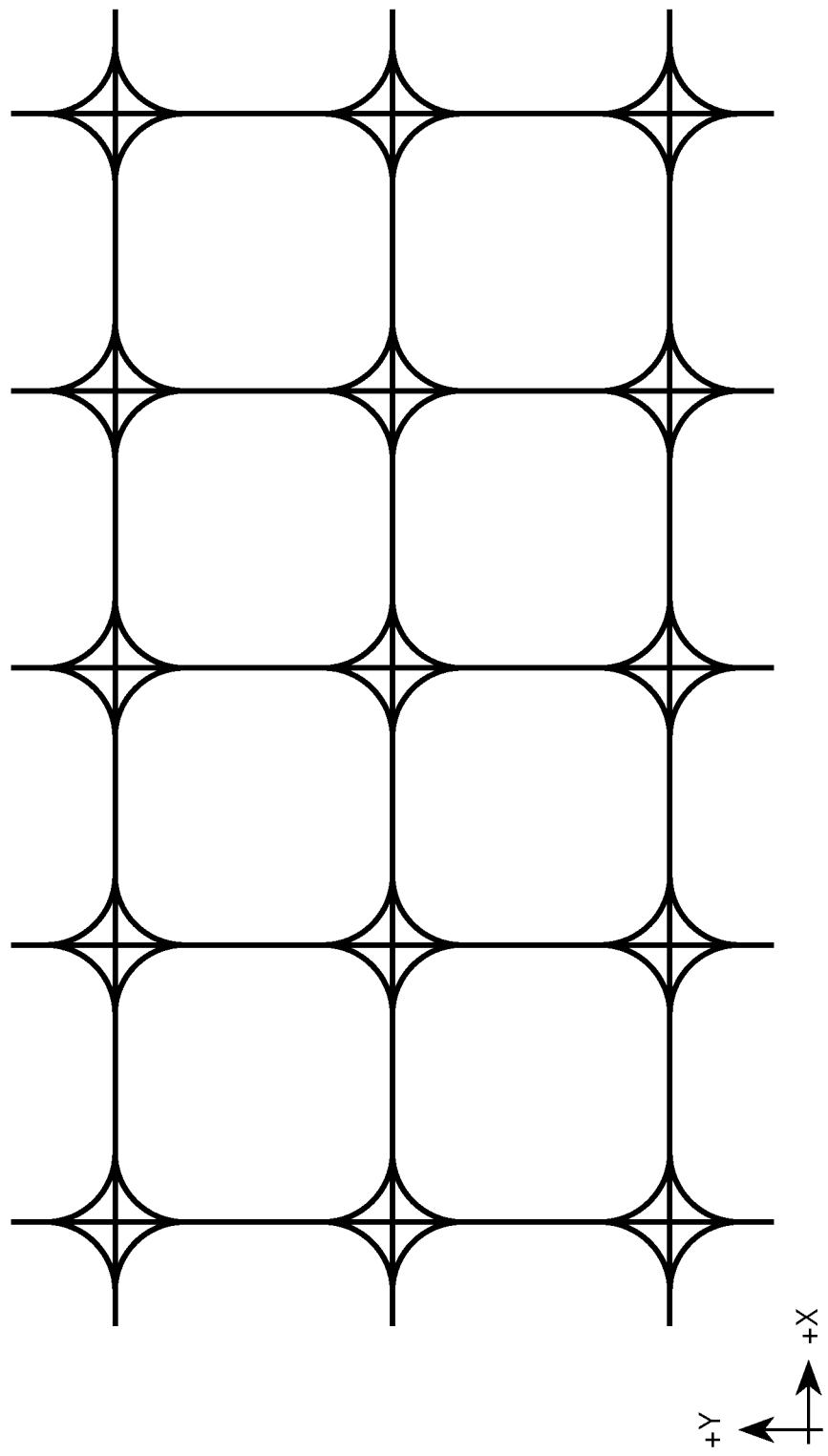
FIG. 4 depicts an orthographic top view of the quadrilateral infill archetype in accordance with the first illustrative embodiment of the present invention.
Figure 5:
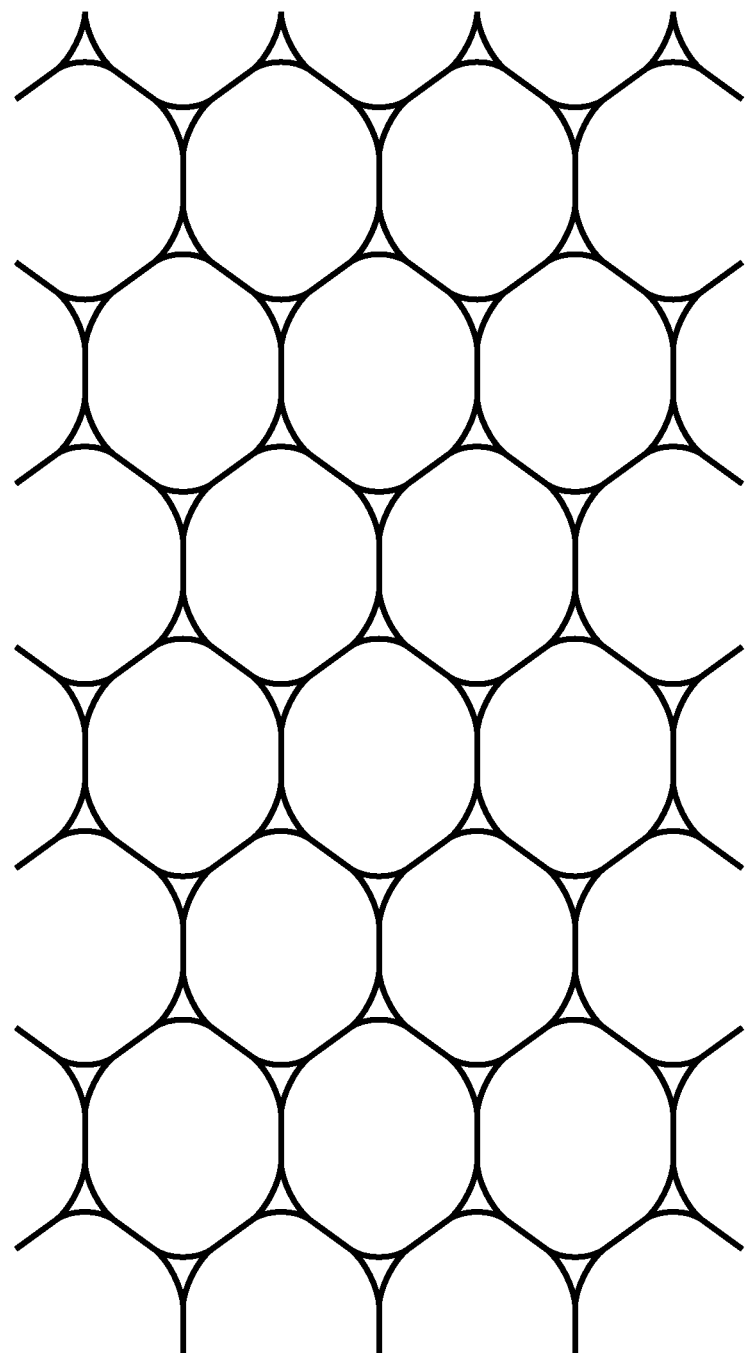
FIG. 5 depicts an orthographic top view of the hexagonal infill archetype in accordance with the second illustrative embodiment of the present invention.

In accordance with the illustrative embodiments, there are two infill archetypes: (1) the quadrilateral infill, and (2) the hexagonal infill. FIG. 4 depicts an orthographic top view of the quadrilateral infill archetype, and FIG. 5 depicts an orthographic top view of the hexagonal infill archetype. The first illustrative embodiment is article 151 with a fully-custom infill that is based on the quadrilateral infill archetype, and the second illustrative embodiment is article 151 with a fully-custom infill that is based on the hexagonal infill archetype.

Figure 6:
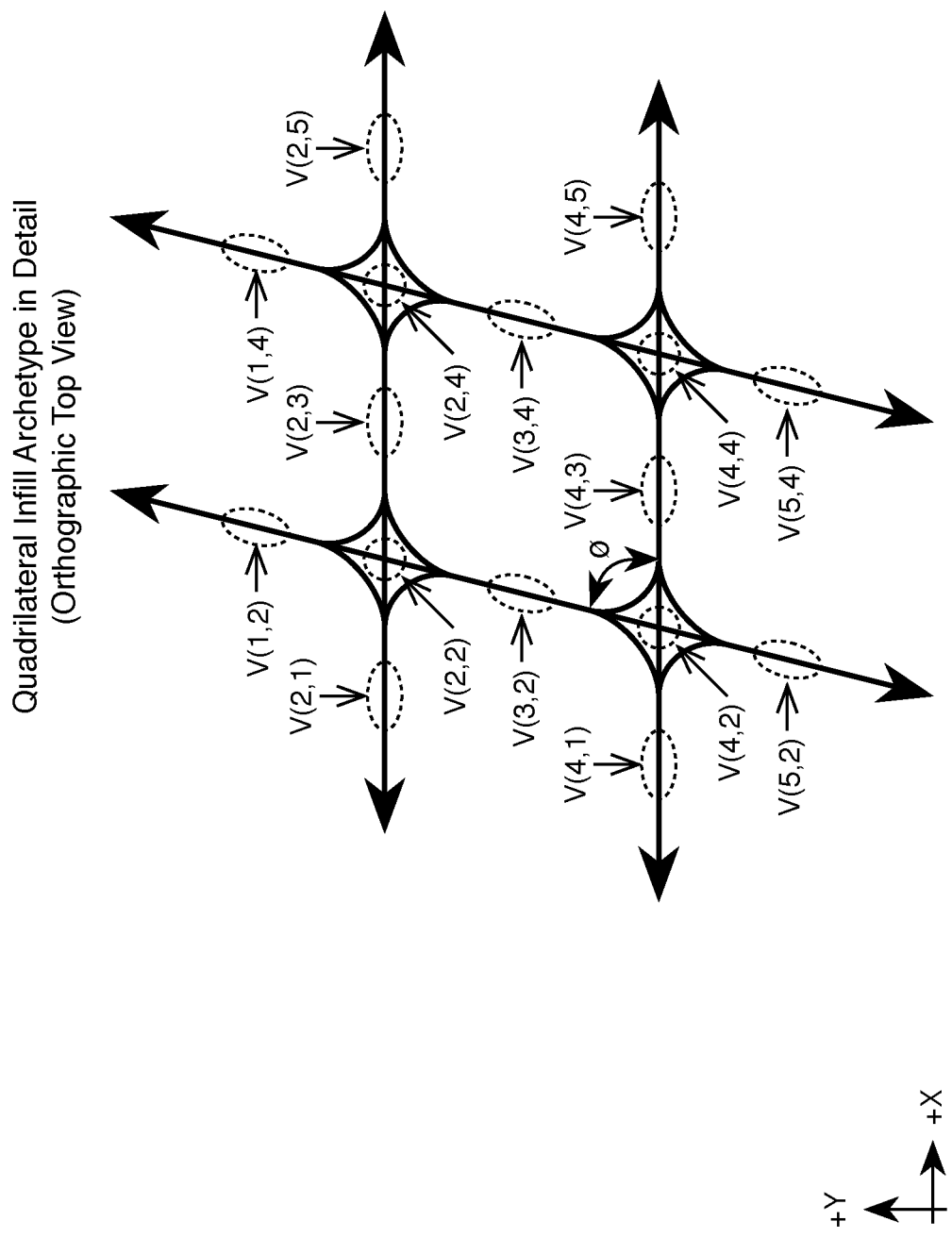
FIG. 6 depicts an orthographic top view of the details of the quadrilateral infill archetype.
Figure 7:
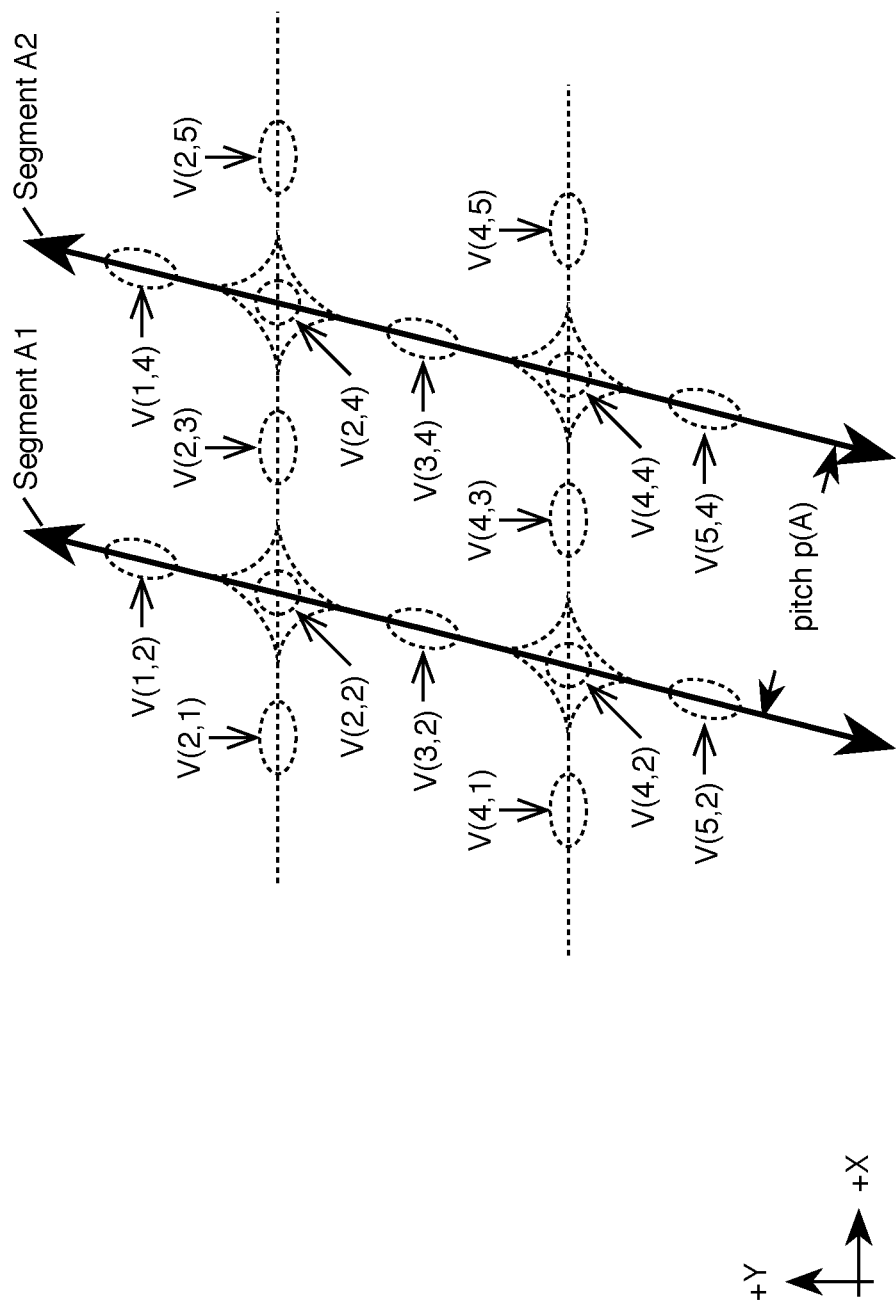
FIG. 7 depicts an orthographic top view of the segments of filament in archetype Layer "A" in relation to the segments of filament in the quadrilateral infill as a whole.
Figure 8:
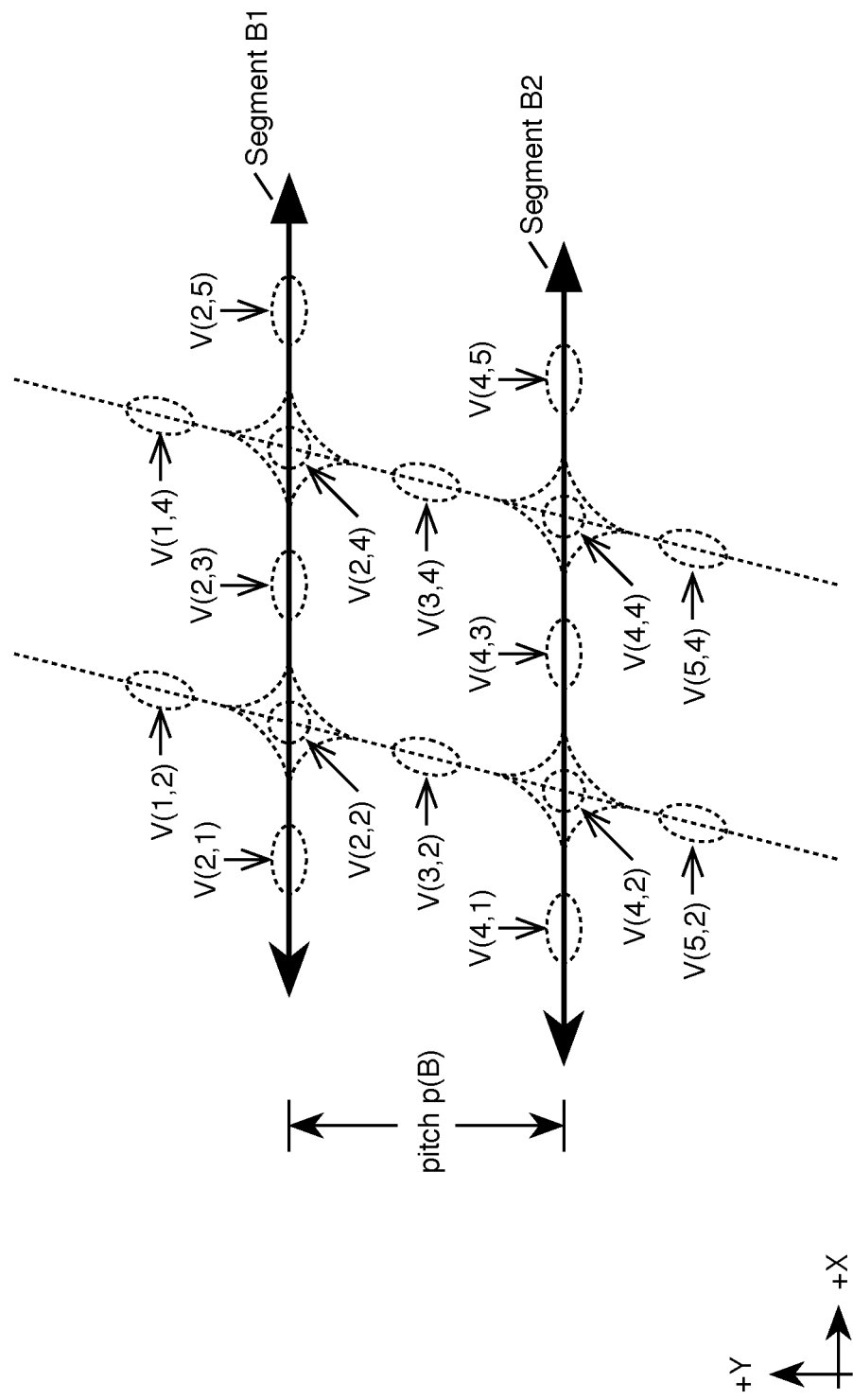
FIG. 8 depicts an orthographic top view of the segments of filament in archetype Layer "B" in relation to the segments of filament in the quadrilateral infill as a whole.
Figure 9:
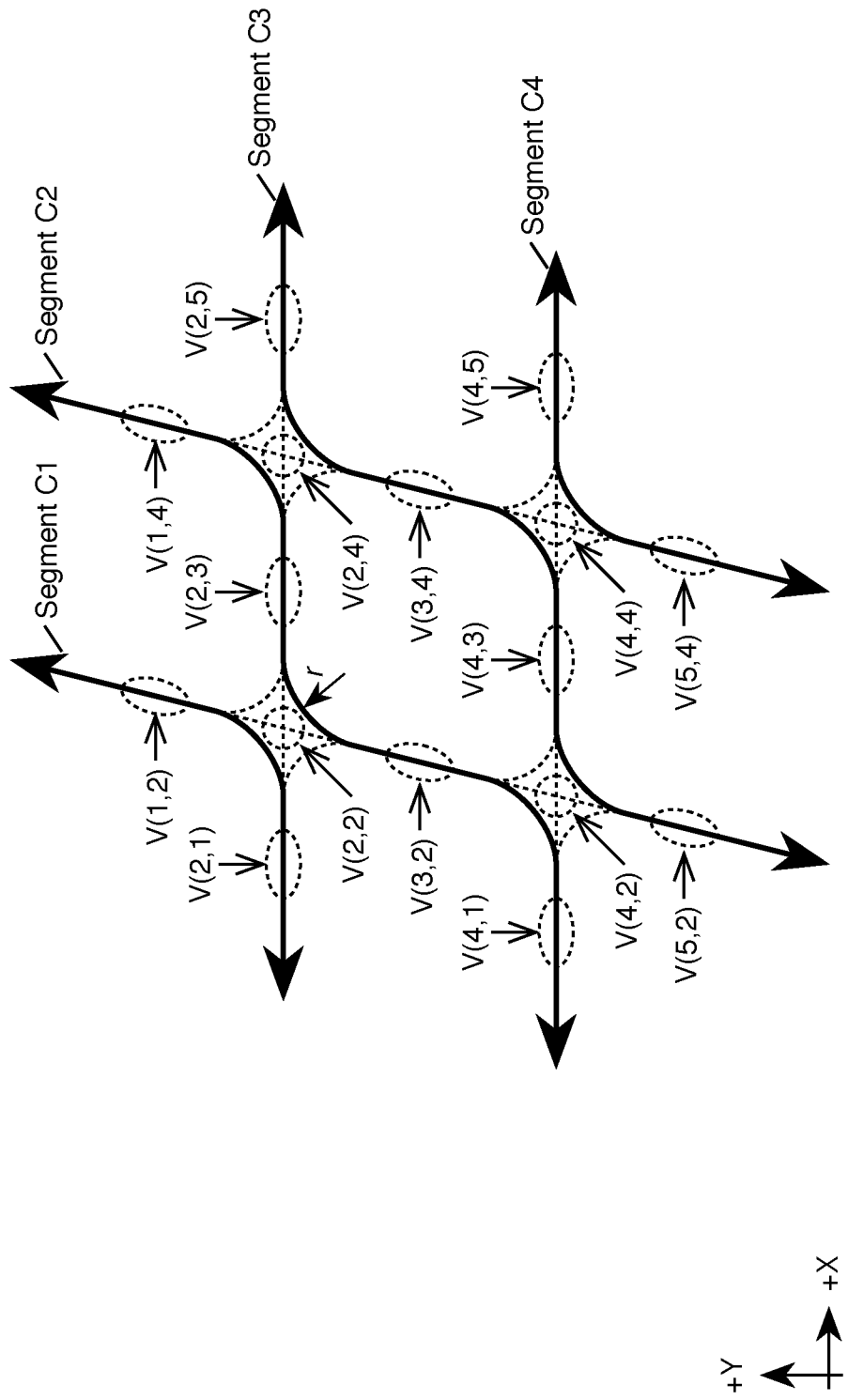
FIG. 9 depicts an orthographic top view of the segments of filament in archetype Layer "C" in relation to the segments of filament in the quadrilateral infill as a whole.
Figure 10:
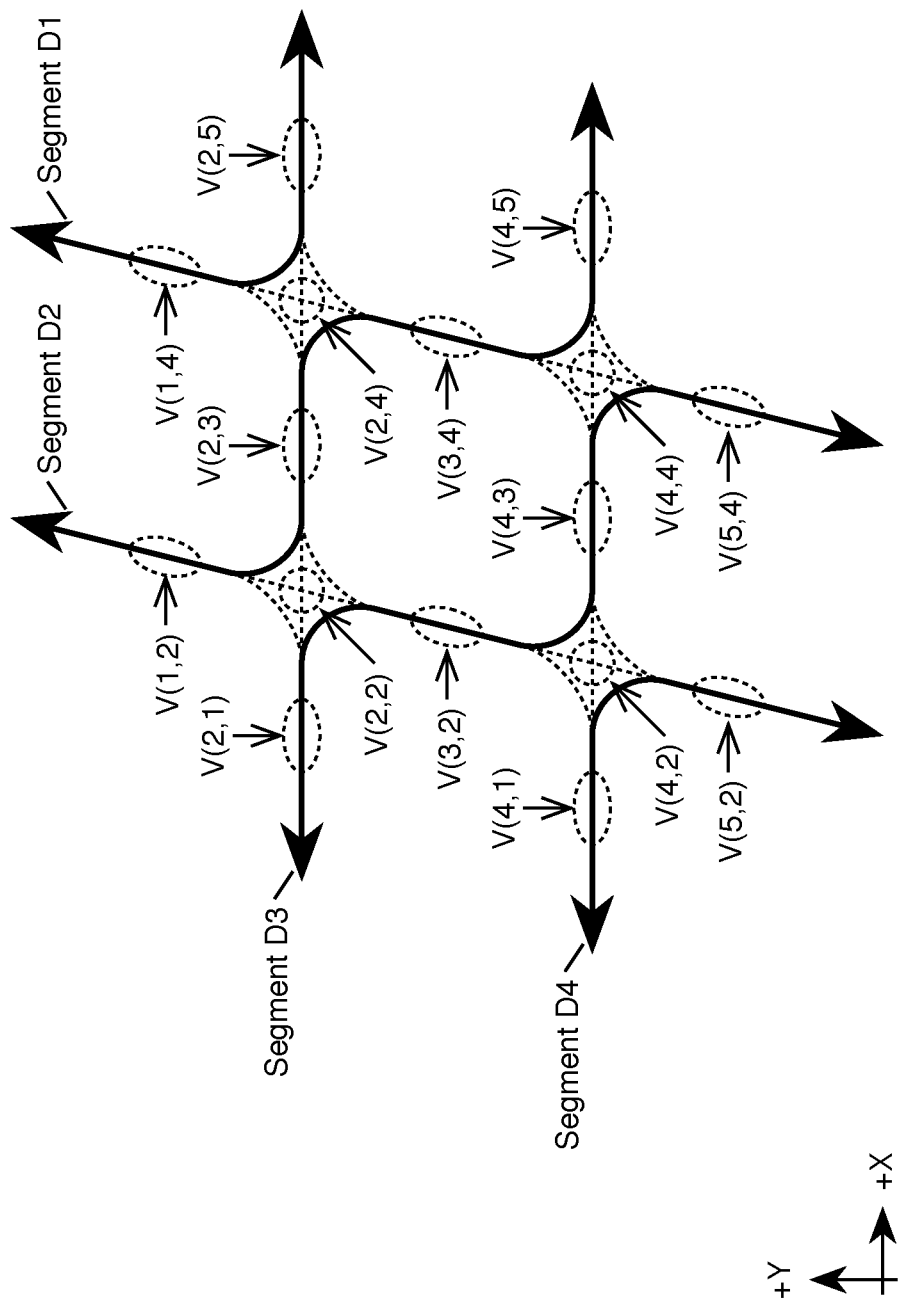
FIG. 10 depicts an orthographic top view of the segments of filament in archetype Layer "D" in relation to the segments of filament in the quadrilateral infill as a whole.

Article 151 with a Fully-Custom Infill Based on the Quadrilateral Infill Archetype FIG. 6 depicts an orthographic top view of the quadrilateral infill archetype in detail. The quadrilateral infill archetype comprises a combination of four archetype layers, which are called "Layer A", "Layer B", "Layer C", and "Layer D". FIG. 7 depicts an orthographic top view of the segments of filament in archetype Layer A in relation to the quadrilateral infill archetype as a whole. FIG. 8 depicts an orthographic top view of the segments of filament in archetype Layer B in relation to the quadrilateral infill archetype as a whole. FIG. 9 depicts an orthographic top view of the segments of filament in archetype Layer C in relation to the quadrilateral infill archetype as a whole. FIG. 10 depicts an orthographic top view of the segments of filament in archetype Layer D in relation to the quadrilateral infill archetype as a whole. It will be clear to those skilled in the art, after reading this disclosure, how to determine the contribution that each layer makes on the structural and other physical properties of article 151 as a whole.

In accordance with the quadrilateral infill archetype, each layer comprises one or more non-overlapping segments of filament, and, therefore, the thickness of each layer is determined by the thickness of the segments in that layer.

In accordance with the first illustrative embodiment, each segment in each layer has after deposition a thickness of 250 µm, and, therefore, each layer has a thickness of 250 µm. It will be clear to those skilled in the art, however, after reading this disclosure, how to make and use alternative embodiments of the present invention in which each segment in each layer has after deposition any thickness (e.g., 25 µm, 100 µm, 500 µm, 1000 µm, 5000 µm, 25,000 µm, etc.) and each layer has any thickness (e.g., 25 µm, 100 µm, 500 µm, 1000 µm, 5000 µm, 25,000 µm, etc.). Furthermore, it will be clear to those skilled in the art, after reading this disclosure, how to make and use alternative embodiments of the present invention in which one or more layers has a different thickness than one or more other layers.

In accordance with the first illustrative embodiment, the number of layers L in the fully-custom infill for article 151 is based on the thickness of article 151 (i.e., 4 cm. or 40,000 µm) and the thickness of each layer (i.e., 250 µm). In particular, the fully-custom infill for article 151, in accordance with the first illustrative embodiment, comprises:

$$L = \frac{40,000 \ \mu m}{250 \ \mu m} = 160 \text{ layers} \quad \text{(Eq. 1)}$$

It will be clear to those skilled in the art, after reading this disclosure, how to make and use alternative embodiments of the present invention in which the fully-custom infill comprises any number of layers L.

Figure 16:
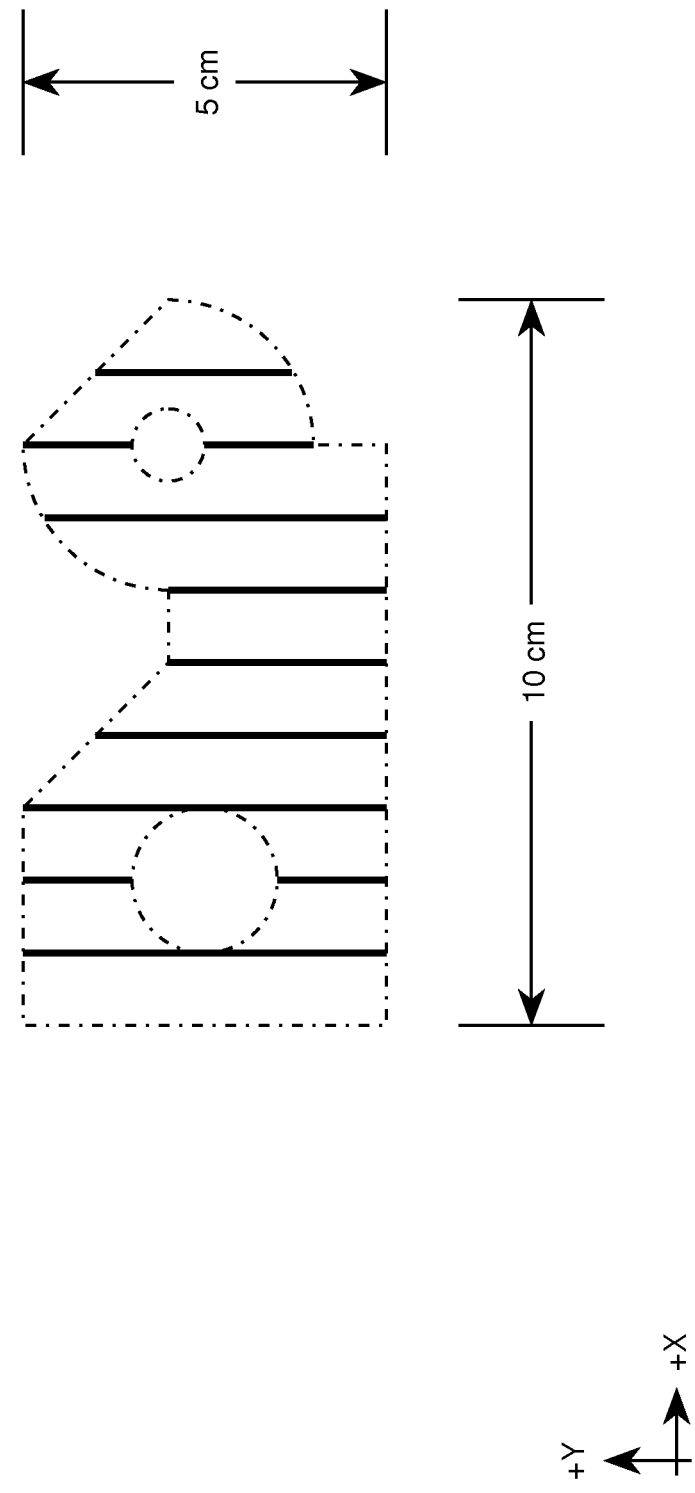
FIG. 16 depicts an orthographic top view of the segments in a Layer A layer in the fully-custom infill of article 151 in accordance with the first illustrative embodiment.

Referring to FIG. 7, the Quadrilateral Infill Layer A Archetype comprises one or more segments of filament (e.g., segment A1, segment A2, etc.) and each of the segments is straight. Furthermore, the segments in the Layer A layers in the fully-custom infill for article 151 are also straight (as shown in FIG. 16). It will be clear to those skilled in the art, however, after reading this disclosure, how to make and use a fully-custom infill in which some or all of the segments in a Layer A layer are not straight.

The segments in the Quadrilateral Infill Layer A Archetype are deposited in parallel. Furthermore, the segments in the Layer A layers in the fully-custom infill for article 151 are also deposited in parallel (as shown in FIG. 16). It will be clear to those skilled in the art, however, after reading this disclosure, how to make and use a fully-custom infill in which some or all of the segments in a Layer A layer are not parallel.

The segments in the Quadrilateral Infill Layer A Archetype are deposited in parallel at a distance or "pitch" of p(A) cm. apart. In particular, the segments in the Layer A layers in the fully-custom infill for article 151 are deposited at a distance of 1 cm. apart (as shown in FIG. 16). It will be clear to those skilled in the art, however, after reading this disclosure, how to make and use a fully-custom infill in which the segments are deposited in parallel at any distance apart. Furthermore, it will be clear to those skilled in the art, after reading this disclosure, how to make and use a fully-custom infill in which some or all of the segments in a Layer A layer are deposited at a different distance apart.

In FIG. 7 it can be seen that segment A1 passes through five volumes of space: V(1,2), V(2,2), V(3,2), V(4,2), and V(5,2), and segment A2 passes through five volumes of space V(1,4), V(2,4), V(3,4), V(4,4), and V(5,4).

Segment A1 is fused to and is parallel to the segment(s) that it touches, if any, within the volume of space V(1,2). Segment A1 is fused to the segment(s), if any, that it touches within the volume of space V(2,2). Segment A1 is fused to and is parallel to the segment(s), if any, that it touches within the volume of space V(3,2). Segment A1 is fused to the segment(s), if any, that it touches within the volume of space V(4,2). Segment A1 is fused to and is parallel to the segment(s), if any, that it touches within the volume of space V(5,2).

Segment A2 is fused to and is parallel to the segment(s) that it touches, if any, within the volume of space V(1,4).

Segment A2 is fused to the segment(s), if any, that it touches within the volume of space V(2,4). Segment A2 is fused to and is parallel to the segment(s), if any, that it touches within the volume of space V(3,4). Segment A2 is fused to the segment(s), if any, that it touches within the volume of space V(4,4). Segment A2 is fused to and is parallel to the segment(s), if any, that it touches within the volume of space V(5,4).

Figure 17:
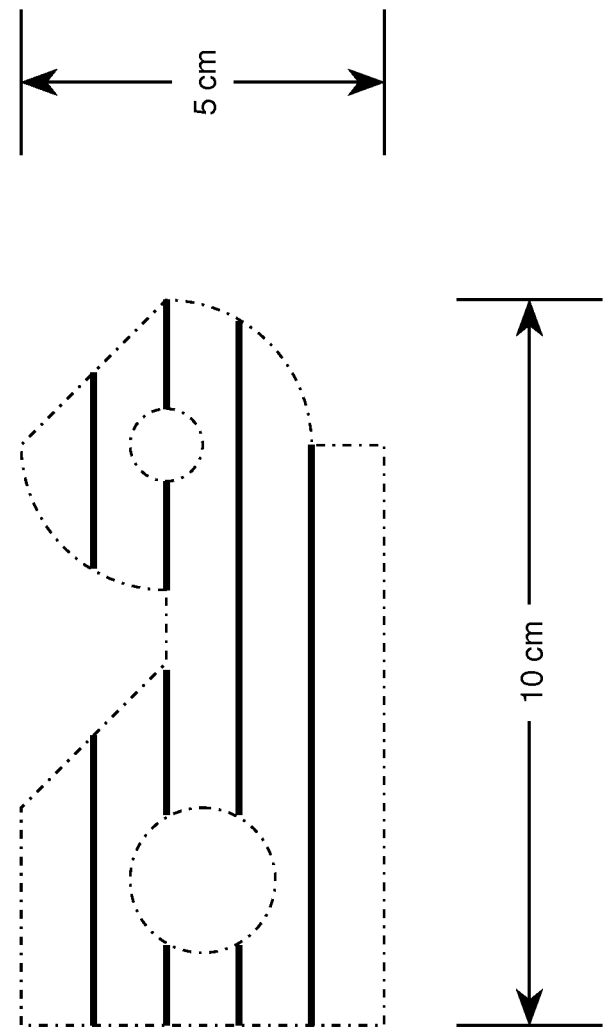
FIG. 17 depicts an orthographic top view of the segments in a Layer B layer in the fully-custom infill of article 151 in accordance with the first illustrative embodiment.

Referring to FIG. 8, the Quadrilateral Infill Layer B Archetype comprises one or more segments of filament (e.g., segment B1, segment B2, etc.) and each of the segments is straight. Furthermore, the segments in the Layer B layers in the fully-custom infill for article 151 are also straight (as shown in FIG. 17). It will be clear to those skilled in the art, however, after reading this disclosure, how to make and use a fully-custom infill in which some or all of the segments in a Layer B layer are not straight.

The segments in the Quadrilateral Infill Layer B Archetype are deposited in parallel. Furthermore, the segments in the Layer B layers in the fully-custom infill for article 151 are also deposited in parallel (as shown in FIG. 17). It will be clear to those skilled in the art, however, after reading this disclosure, how to make and use a fully-custom infill in which some or all of the segments in a Layer B layer are not parallel.

The segments in the Quadrilateral Infill Layer B Archetype are deposited in parallel at a distance or "pitch" of p(B) cm. apart. In particular, the segments in the Layer B layers in the fully-custom infill for article 151 are deposited at a distance of 1 cm. apart (as shown in FIG. 17). It will be clear to those skilled in the art, however, after reading this disclosure, how to make and use a fully-custom infill in which the segments are deposited in parallel at any distance apart. Furthermore, it will be clear to those skilled in the art, after reading this disclosure, how to make and use a fully-custom infill in which some or all of the segments in a Layer B layer are deposited at a different distance apart.

In FIG. 8 it can be seen that segment B1 passes through five volumes of space: V(2,1), V(2,2), V(2,3), V(2,4), and V(2,5), and segment B2 passes through five volumes of space V(4,1), V(4,2), V(4,3), V(4,4), and V(4,5).

Segment B1 is fused to and is parallel to the segment(s) that it touches, if any, within the volume of space V(2,1). Segment B1 is fused to the segment(s), if any, that it touches within the volume of space V(2,2). Segment B1 is fused to and is parallel to the segment(s), if any, that it touches within the volume of space V(2,3). Segment B1 is fused to the segment(s), if any, that it touches within the volume of space V(2,4). Segment B1 is fused to and is parallel to the segment(s), if any, that it touches within the volume of space V(2,5).

Segment B2 is fused to and is parallel to the segment(s) that it touches, if any, within the volume of space V(4,1). Segment B2 is fused to the segment(s), if any, that it touches within the volume of space V(4,2). Segment B2 is fused to and is parallel to the segment(s), if any, that it touches within the volume of space V(4,3). Segment B2 is fused to the segment(s), if any, that it touches within the volume of space V(4,4). Segment B2 is fused to and is parallel to the segment(s), if any, that it touches within the volume of space V(4,5).

In accordance with the first illustrative embodiment, the pitch p(A) equals the pitch p(B), but it will be clear to those skilled in the art, after reading this disclosure, how to make and use alternative embodiments of the present invention in which p(A) does not equal p(B).

In accordance with the first illustrative embodiment, the segments in each Layer A layer intersect the segments in each Layer B at $\phi=\pi/2$ radians (i.e., a right angle) but it will be clear to those skilled in the art, after reading this disclosure, how to make and use alternative embodiments of the present invention in which the segments in each Layer A layer intersect the segments in each Layer B an oblique angle $0<\phi<\pi/2$.

Furthermore, it will be clear to those skilled in the art, after reading this disclosure, how to make and use alternative embodiments of the present invention in which the angle θ at which the segments in a Layer A layer intersect the segments in a Layer B varies depending on the layer. For example, the angle θ can be a function of the layer L:

$$\phi=f(L) \tag{Eq. 2}$$

FIG. 32 depicts an orthographic front view of a "bump" that can result in the deviation of the path of a first segment that is caused when the first segment (e.g., segment B1) is deposited over a portion of a second segment (e.g., segment B1). In this case the thickness of diameter or each segment is h, the extent of the bump is 2 h and it occurs over a length of bump p.

Figure 18:
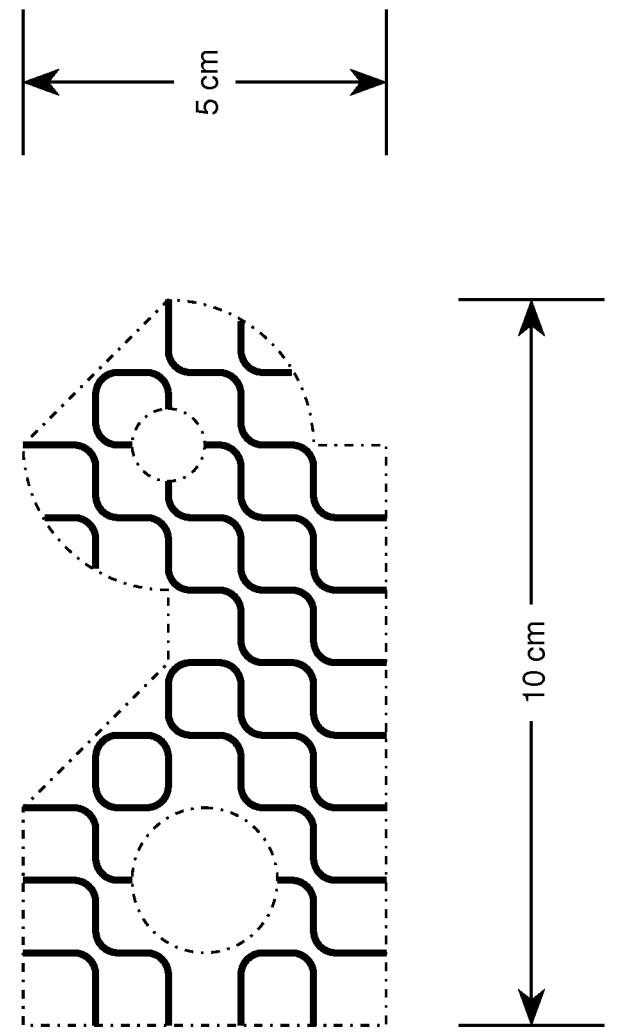
FIG. 18 depicts an orthographic top view of the segments in a Layer C layer in the fully-custom infill of article 151 in accordance with the first illustrative embodiment.

Referring to FIG. 9, the Quadrilateral Infill Layer C Archetype comprises one or more segments of filament (e.g., segment C1, segment C2, segment C3, segment C4, etc.) and each of the segments is serpentine in shape. Furthermore, most, but not all of the segments in the Layer C layers in the fully-custom infill for article 151 are also serpentine (as shown in FIG. 18) but some vary to accommodate the shape of article 151. It will be clear to those skilled in the art, however, after reading this disclosure, how to make and use a fully-custom infill in which some or all of the segments in a Layer C layer are not serpentine. In accordance with the first illustrative embodiment, the segments in a Layer C layer coincide with the segments in Layer A layers and Layer B layers.

In FIG. 9 it can be seen that segment C1 passes through two volumes of space: V(1,2) and V(2,1). Segment C1 does not pass through volume of space V(2,2). Segment C2 passes through four volumes of space: V(1,4), V(2,3), V(3,2), and V(4,1). Segment C2 does not pass through volumes of space V(2,4), V(2,2), or V(4,2). Segment C3 passes through four volumes of space: V(2,5), V(3,4), V(4,3), and V(5,2). Segment C3 does not pass through volumes of space V(2,4), V(4,4), or V(4,2). Segment C4 passes through two volumes of space: V(4,5) and V(5,4). Segment C4 does not pass through volume of space V(4,4).

Segment C1 is fused to and is parallel to the adjacent segment(s), if any, that it touches within the volume of space V(1,2). Segment C1 is fused to and is parallel to the adjacent segment(s), if any, that it touches within the volume of space V(2,1).

Segment C2 is fused to and is parallel to the adjacent segment(s), if any, that it touches within the volume of space V(1,4). Segment C2 is fused to and is parallel to the adjacent segment(s), if any, that it touches within the volume of space V(2,3). Segment C2 is fused to and is parallel to the adjacent segment(s), if any, that it touches within the volume of space V(3,2). Segment C2 is fused to and is parallel to the adjacent segment(s), if any, that it touches within the volume of space V(4,1).

Segment C3 is fused to and is parallel to the adjacent segment(s), if any, that it touches within the volume of space V(2,5). Segment C3 is fused to and is parallel to the adjacent segment(s), if any, that it touches within the volume of space V(3,4). Segment C3 is fused to and is parallel to the adjacent segment(s), if any, that it touches within the volume of space V(4,3). Segment C3 is fused to and is parallel to the adjacent segment(s), if any, that it touches within the volume of space V(5,2).

Segment C4 is fused to and is parallel to the adjacent segment(s), if any, that it touches within the volume of space V(4,5). Segment C4 is fused to and is parallel to the adjacent segment(s), if any, that it touches within the volume of space V(5,4).

The radius r of the turns in all of the segments in a Layer C Archetype is equal to or greater than one-half of the length of bump p for the segments caused by the overlap of the segments in Layer A and Layer B layers.

$$r \geq \frac{\rho}{2} \qquad \text{(Eq. 3)}$$

Referring to FIG. 10, the Quadrilateral Infill Layer D Archetype comprises one or more segments of filament (e.g., segment D1, segment D2, segment D3, segment D4, etc.) and each of the segments is serpentine in shape. Furthermore, most, but not all of the segments in the Layer D layers in the fully-custom infill for article 151 are also serpentine (as shown in FIG. 19) but some vary to accommodate the shape of article 151. It will be clear to those skilled in the art, however, after reading this disclosure, how to make and use a fully-custom infill in which some or all of the segments in a Layer D layer are not serpentine. In accordance with the first illustrative embodiment, the segments in a Layer D layer coincide with the segments in Layer A layers and Layer B layers.

Referring again to FIG. 10, segment D1 passes through two volumes of space: V(1,4) and V(2,5). Segment D1 does not pass through volume of space V(2,4). Segment D2 passes through four volumes of space: V(1,2), V(2,3), V(3,4), and V(4,5). Segment D2 does not pass through volumes of space V(2,2), V(2,4), or V(4,4). Segment D3 passes through four volumes of space: V(2,1), V(3,2), V(4,3), and V(5,4). Segment D3 does not pass through volumes of space V(2,2), V(4,2), or V(4,4). Segment D4 passes through two volumes of space: V(4,1) and V(5,2). Segment D4 does not pass through volume of space V(4,2).

Segment D1 is fused to and is parallel to the adjacent segment(s), if any, that it touches within the volume of space V(1,4). Segment D1 is fused to and is parallel to the adjacent segment(s), if any, that it touches within the volume of space V(2,5).

Segment D2 is fused to and is parallel to the adjacent segment(s), if any, that it touches within the volume of space V(1,2). Segment D2 is fused to and is parallel to the adjacent segment(s), if any, that it touches within the volume of space V(2,3). Segment D2 is fused to and is parallel to the adjacent segment(s), if any, that it touches within the volume of space V(3,4). Segment D2 is fused to and is parallel to the adjacent segment(s), if any, that it touches within the volume of space V(4,5).

Segment D3 is fused to and is parallel to the adjacent segment(s), if any, that it touches within the volume of space V(2,1). Segment D3 is fused to and is parallel to the adjacent segment(s), if any, that it touches within the volume of space V(3,2). Segment D3 is fused to and is parallel to the adjacent segment(s), if any, that it touches within the volume of space V(4,3). Segment D3 is fused to and is parallel to the adjacent segment(s), if any, that it touches within the volume of space V(5,4).

Segment D4 is fused to and is parallel to the adjacent segment(s), if any, that it touches within the volume of space V(4,1). Segment D1 is fused to and is parallel to the adjacent segment(s), if any, that it touches within the volume of space V(5,2).

The radius r of the turns in all of the segments in a Layer D Archetype is equal to or greater than one-half of the distance of bump p for the segments caused by the overlap of the segments in Layer A and Layer B layers (as shown in FIG. 3).

Volumes of space V(1,2), V(1,4), V(2,1), V(2,2), V(2,3), V(2,4), V(2,5), V(3,2), V(3,4), V(4,1), V(4,2), V(4,3), V(4,4), V(4,5), V(5,2), and V(5,4) are disjoint (i.e., mutually exclusive).

Figure 11:
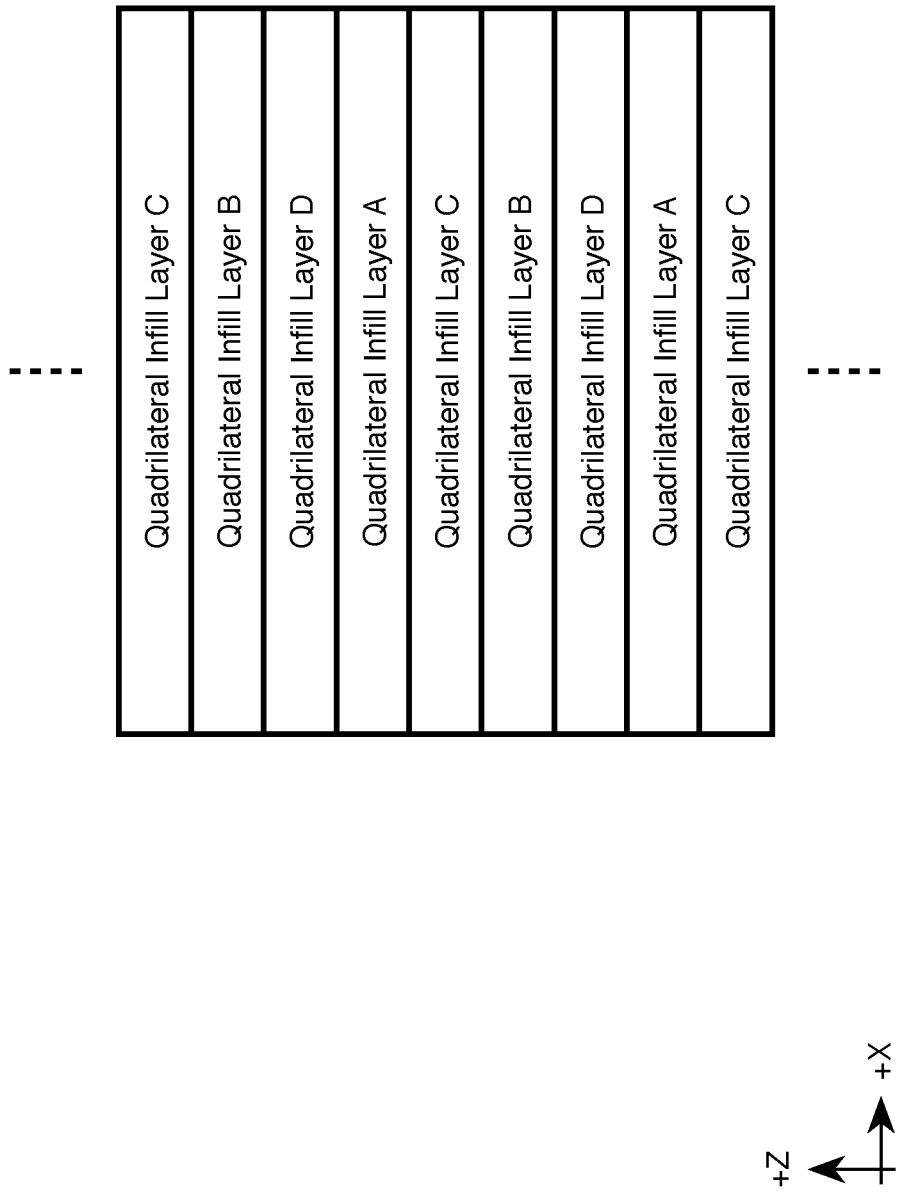
FIG. 11 depicts the order of depositing Quadrilateral Infill Archetype Layers in accordance with the first illustrative embodiment of the present invention.

Each of the L=160 layers in the fully-custom infill for article 151 is based on one of the four Quadrilateral Infill Layer Archetypes. The second column in Table 1 and FIG. 11 depict which Layer Archetype is the basis for each layer in the fully-custom infill for article 151.

TABLE 1

Quadrilateral Infill Archetype Layers at Each Layer for Fully-Custom Infill

| Layer L | Archetype Layer (First Illustrative Embodiment) | Archetype Layer (First Alternative Embodiment) | Archetype Layer (Second Alternative Embodiment) | Archetype Layer (Third Alternative Embodiment) |
|---|---|---|---|---|
| 160 | Layer B | Layer D | Layer B | Layer A |
| 159 | Layer D | Layer C | Layer C | Layer D |
| 158 | Layer A | Layer B | Layer D | Layer B |
| 157 | Layer C | Layer A | Layer A | Layer C |
| . | . | . | . | . |
| . | . | . | . | . |
| . | . | . | . | . |
| 9 | Layer C | Layer A | Layer D | Layer C |
| 8 | Layer B | Layer D | Layer B | Layer A |
| 7 | Layer D | Layer C | Layer C | Layer D |
| 6 | Layer A | Layer B | Layer A | Layer B |
| 5 | Layer C | Layer A | Layer D | Layer C |
| 4 | Layer B | Layer D | Layer B | Layer B |
| 3 | Layer D | Layer C | Layer D | Layer D |
| 2 | Layer A | Layer B | Layer A | Layer A |
| 1 | Layer C | Layer A | Layer C | Layer C |

Figure 12:
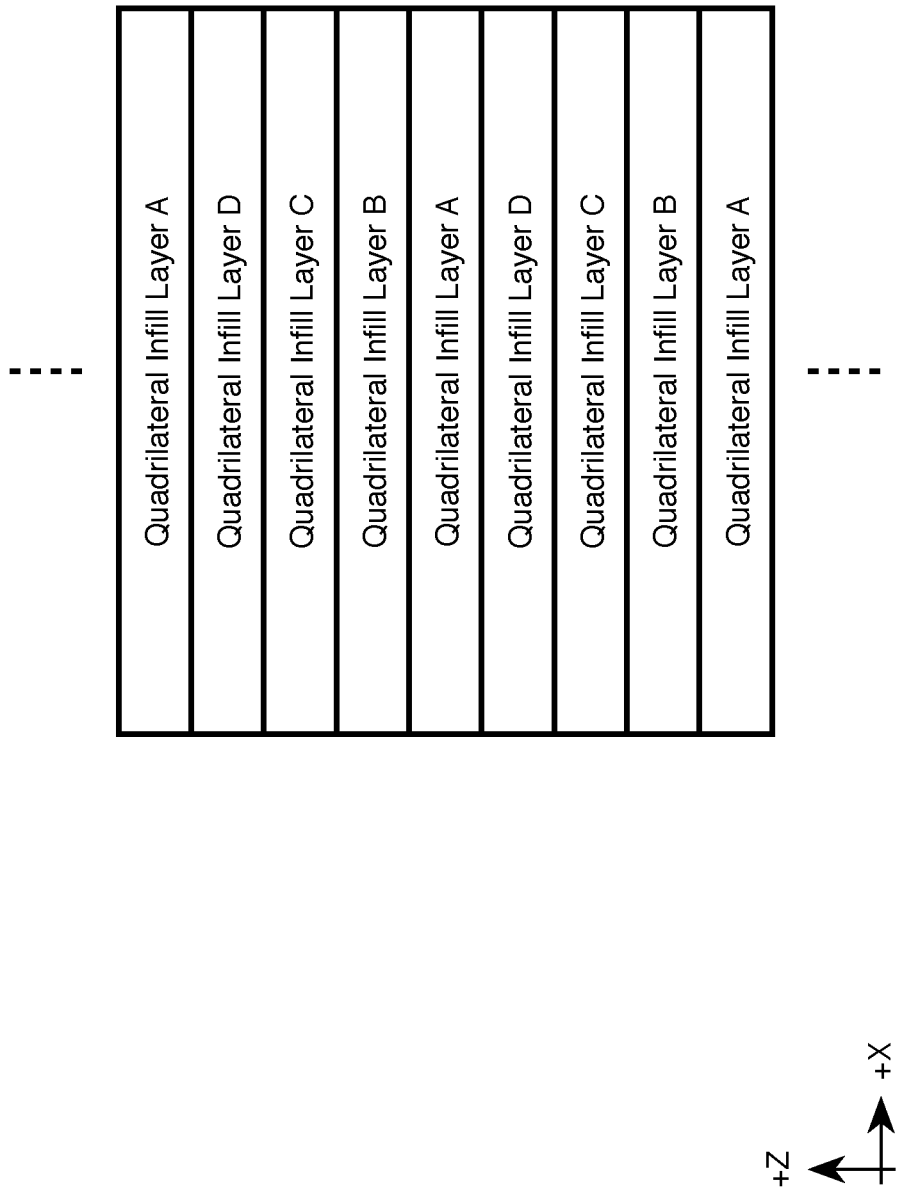
FIG. 12 depicts the order of depositing Quadrilateral Infill Archetype Layers in accordance with the first illustrative embodiment of the present invention.
Figure 13:
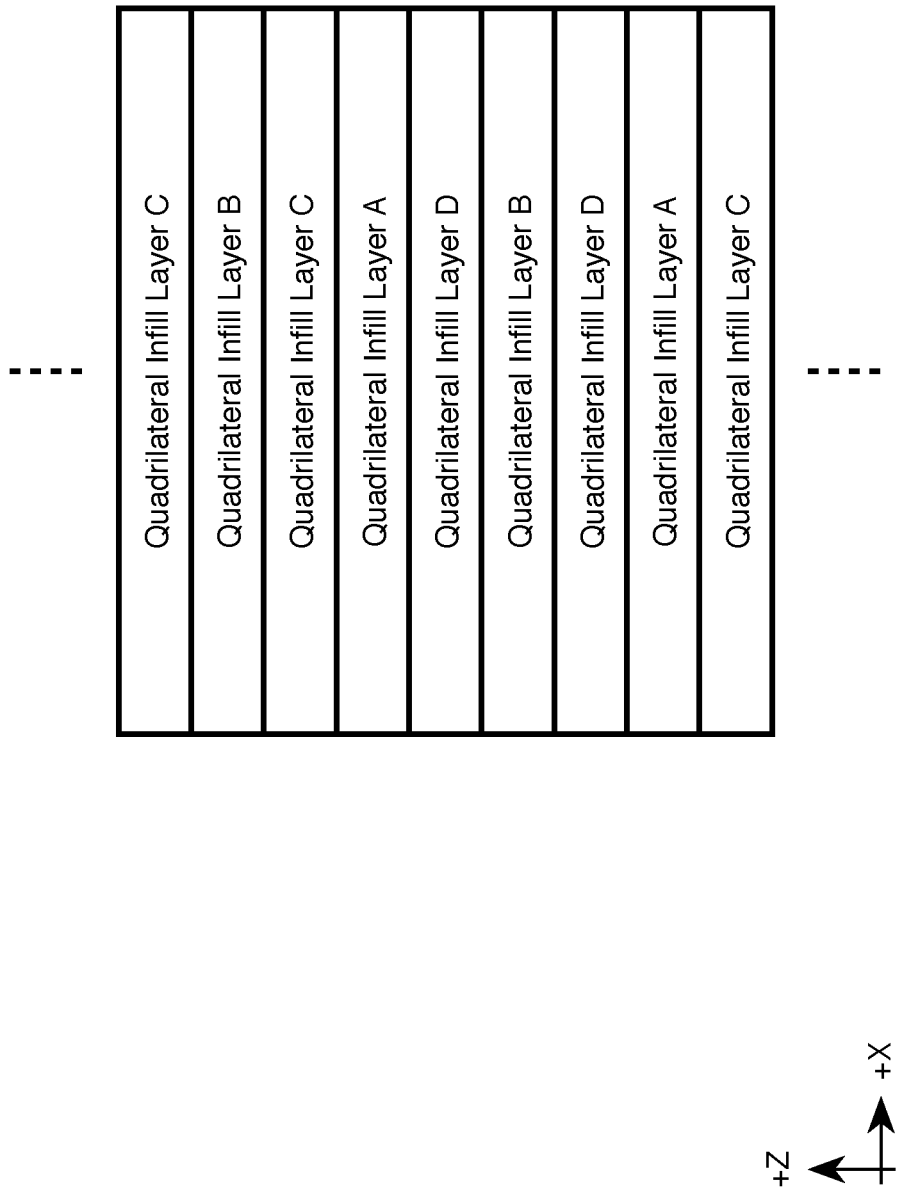
FIG. 13 depicts the order of depositing Quadrilateral Infill Archetype Layers in accordance with the first illustrative embodiment of the present invention.
Figure 14:
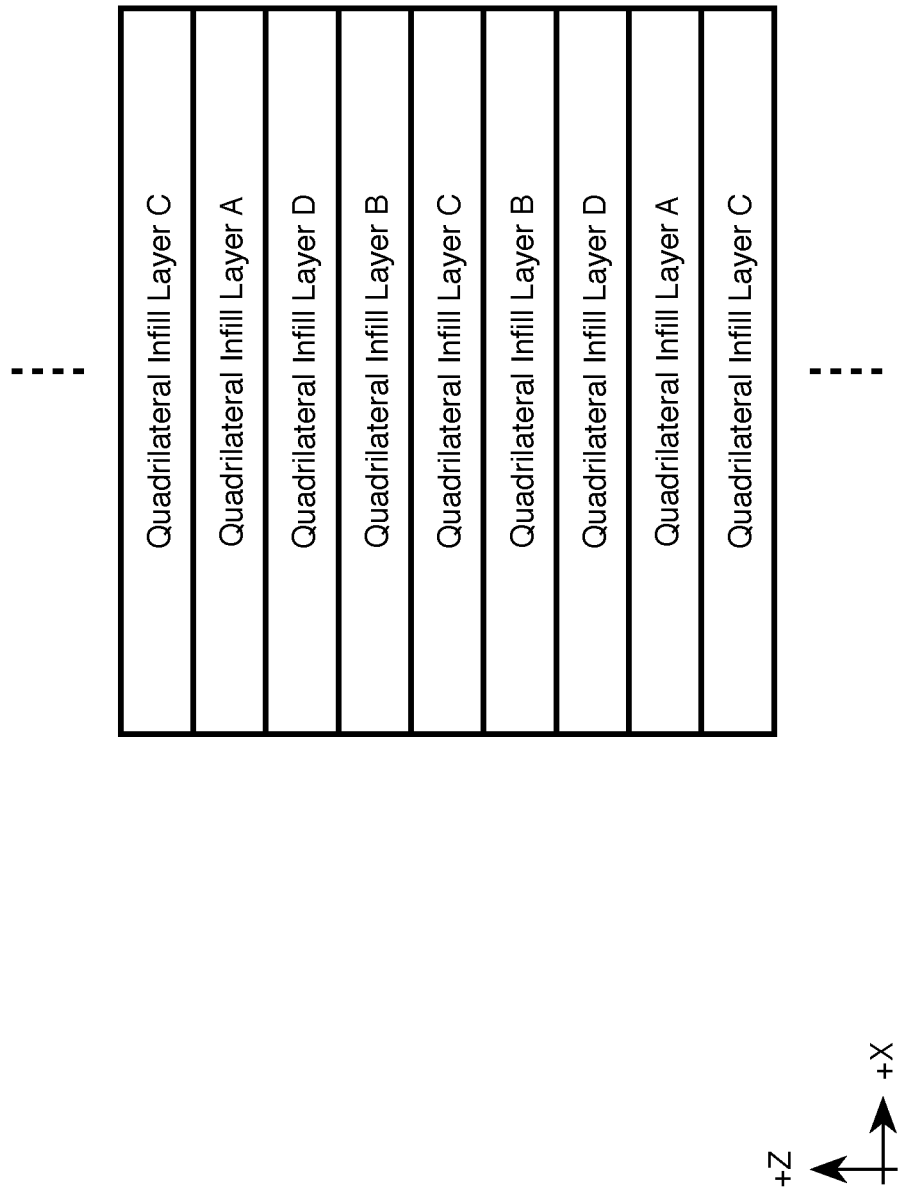
FIG. 14 depicts the order of depositing Quadrilateral Infill Archetype Layers in accordance with the first illustrative embodiment of the present invention.

The third column in Table 1 and FIG. 12 depict which Layer Archetype is the basis for each layer in a first alternative embodiment of the fully-custom infill for article 151. The fourth column in Table 1 and FIG. 13 depict which Layer Archetype is the basis for each layer in a second alternative embodiment of the fully-custom infill for article 151. The fifth column in Table 1 and FIG. 14 depict which Layer Archetype is the basis for each layer in a third alternative embodiment of the fully-custom infill for article 151. It will be clear to those skilled in the art, after reading this disclosure, which orders and combinations of layers are satisfactory and which orders and combinations of layers are not satisfactory.

Furthermore, it will be clear to those skilled in the art, after reading this disclosure, that the number of layers based on each archetype layer should be approximately equal:

$$N(A) \approx N(B) \approx N(C) \approx N(D) \qquad \text{(Eq. 4)}$$

Where N(A) is the number of Layer A layers in the fully-custom infill, N(B) is the number of Layer B layers in the fully-custom infill, N(C) is the number of Layer C layers in the fully-custom infill, and N(D) is the number of Layer D layers in the fully-custom infill. It will be clear to those skilled in the art, after reading this disclosure, how to determine the effect that each of these deposition orders makes on the structural and other physical properties of article 151 as a whole.

Figure 15:
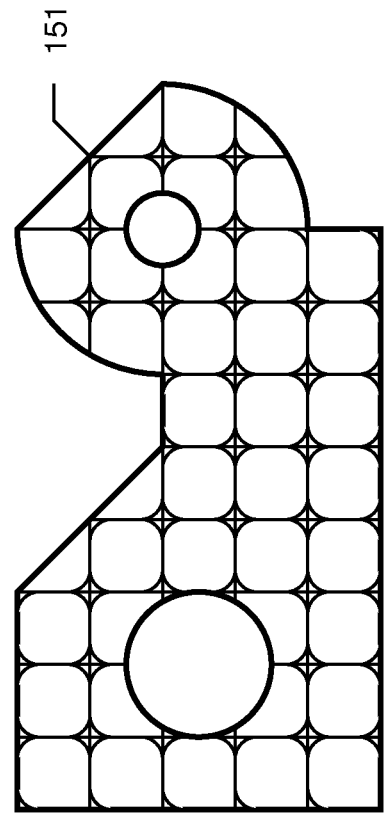
FIG. 15 depicts an orthographic top view of the fully-custom infill of article 151 at cross-section AA-AA in accordance with the first illustrative embodiment, which is the top of layer L=160.

FIG. 15 depicts an orthographic top view of the fully-custom infill of article 151 at cross-section AA-AA in accordance with the first illustrative embodiment, which is the top of layer L=160.

FIG. 16 depicts an orthographic top view of the segments in a Layer A layer in the fully-custom infill of article 151 in accordance with the first illustrative embodiment.

FIG. 17 depicts an orthographic top view of the segments in a Layer B layer in the fully-custom infill of article 151 in accordance with the first illustrative embodiment.

FIG. 18 depicts an orthographic top view of the segments in a Layer C layer in the fully-custom infill of article 151 in accordance with the first illustrative embodiment.

FIG. 19 depicts an orthographic top view of the segments in a Layer D layer in the fully-custom infill of article 151 in accordance with the first illustrative embodiment.

Article 151 with a Fully-Custom Infill Based on the Hexagonal Infill Archetype

Figure 20:
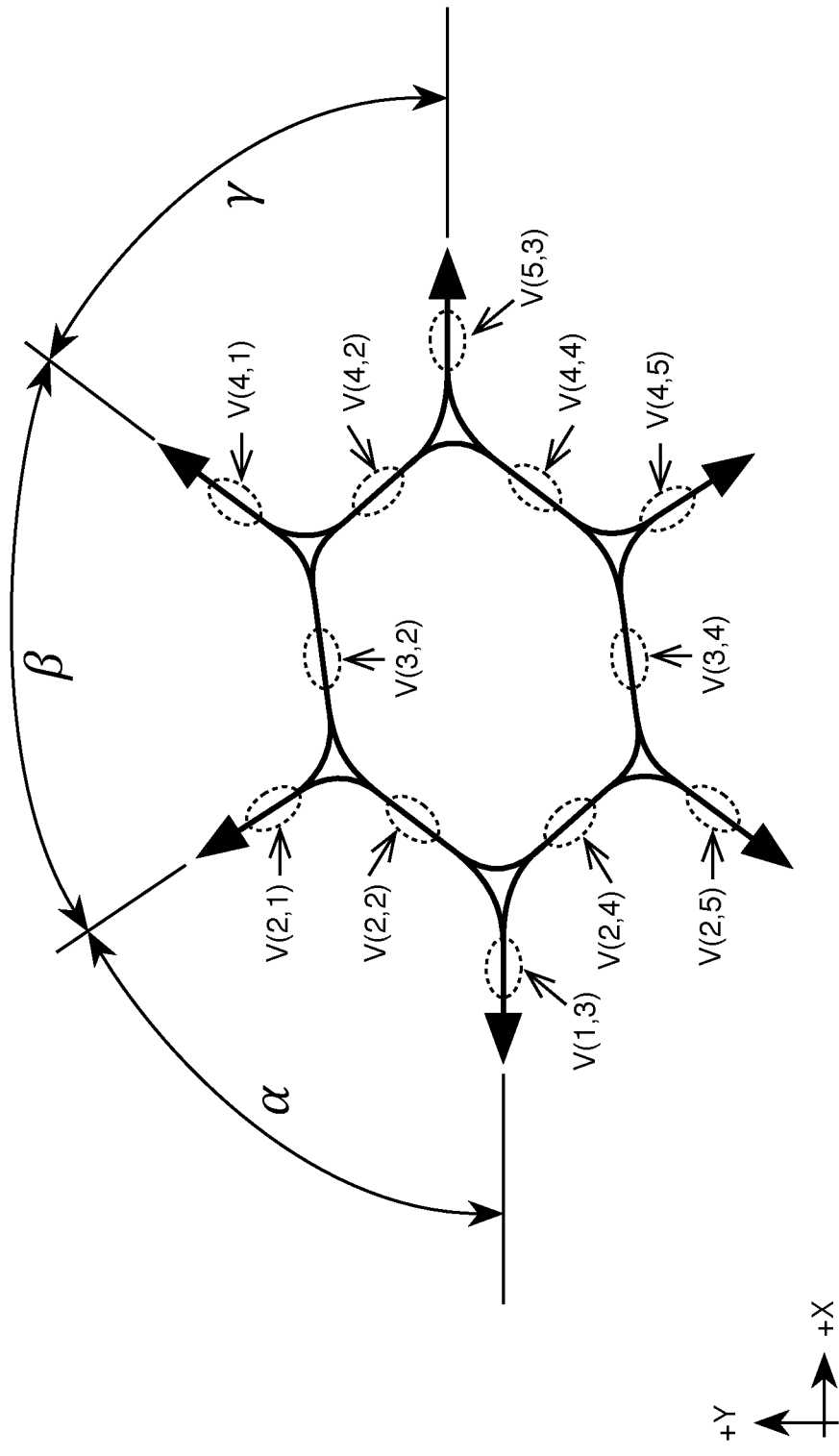
FIG. 20 depicts an orthographic top view of the hexagonal infill archetype in detail.
Figure 21:
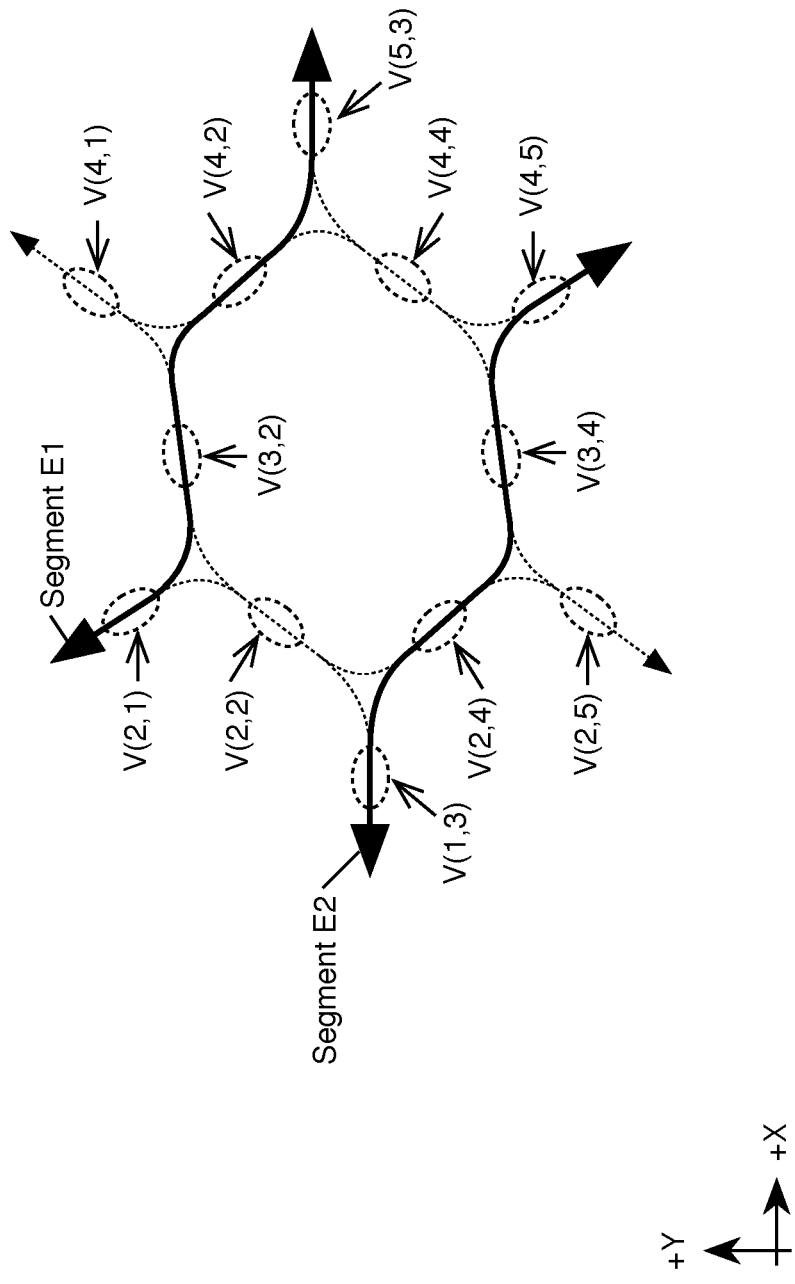
FIG. 21 depicts an orthographic top view of the segments of filament in archetype Layer E in relation to the hexagonal infill archetype as a whole.
Figure 22:
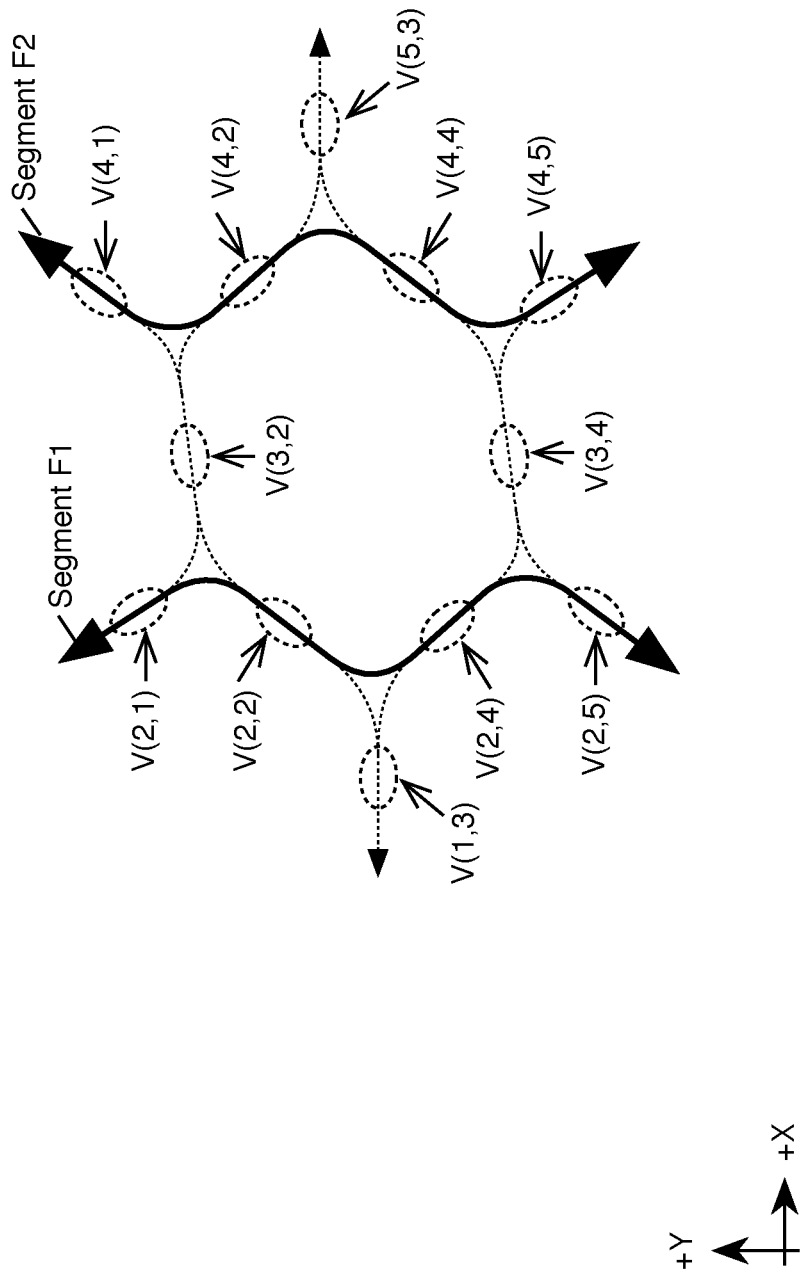
FIG. 22 depicts an orthographic top view of the segments of filament in archetype Layer F in relation to the hexagonal infill archetype as a whole.
Figure 23:
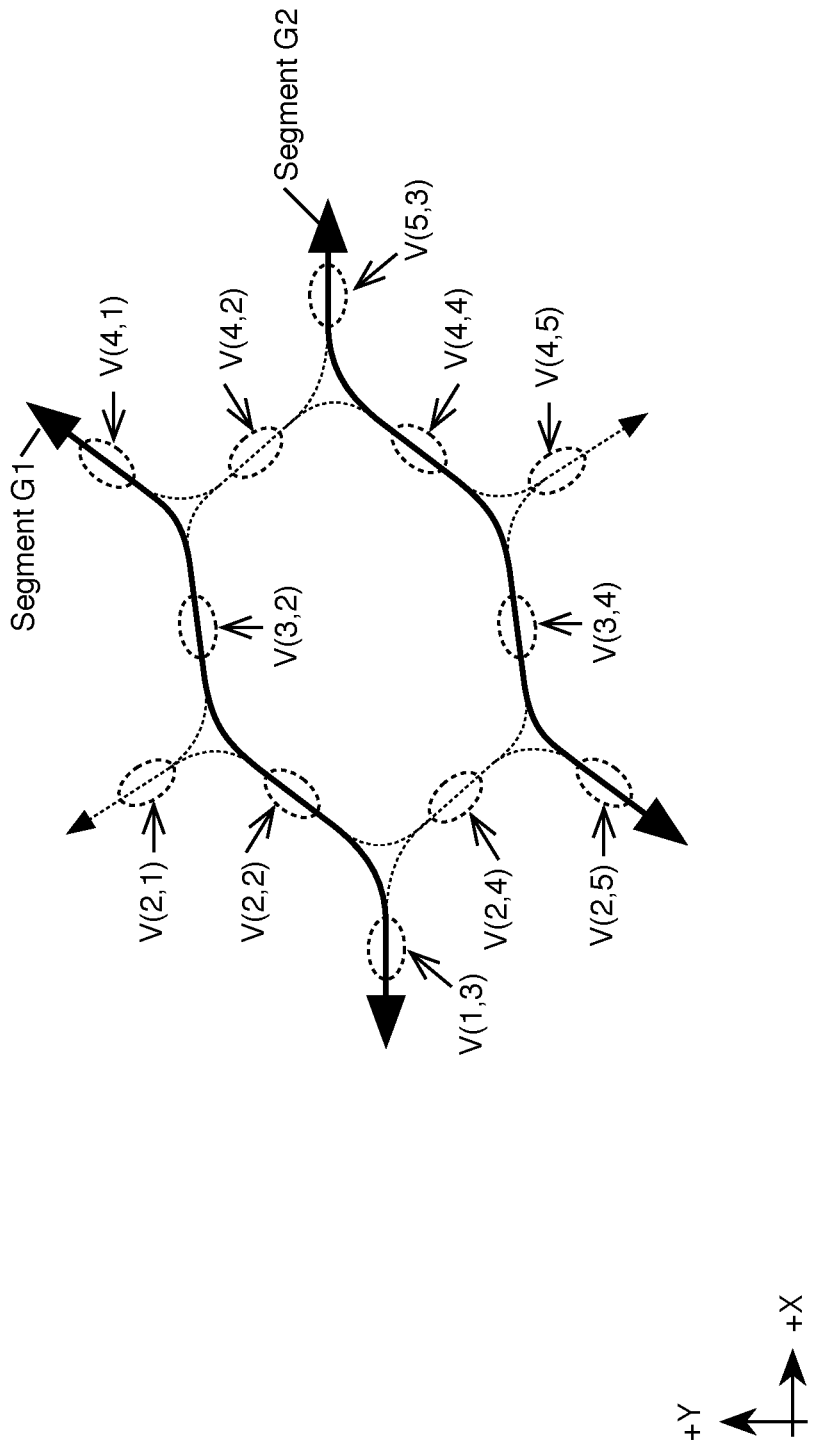
FIG. 23 depicts an orthographic top view of the segments of filament in archetype Layer G in relation to the hexagonal infill archetype as a whole.

FIG. 20 depicts an orthographic top view of the hexagonal infill archetype in detail. The hexagonal infill archetype comprises a combination of three archetype layers, which are called "Layer E", "Layer F", and "Layer G". FIG. 21 depicts an orthographic top view of the segments of filament in archetype Layer E in relation to the hexagonal infill archetype as a whole. FIG. 22 depicts an orthographic top view of the segments of filament in archetype Layer F in relation to the hexagonal infill archetype as a whole. FIG. 23 depicts an orthographic top view of the segments of filament in archetype Layer G in relation to the hexagonal infill archetype as a whole. It will be clear to those skilled in the art, after reading this disclosure, how to determine the contribution that each layer makes on the structural and other physical properties of article 151 as a whole.

In accordance with the hexagonal infill archetype, each layer comprises one or more non-overlapping segments of filament, and, therefore, the thickness of each layer is determined by the thickness of the segments in that layer.

In accordance with the second illustrative embodiment, each segment in each layer has after deposition a thickness of 200 µm, and, therefore, each layer has a thickness of 200 µm. It will be clear to those skilled in the art, however, after reading this disclosure, how to make and use alternative embodiments of the present invention in which each segment in each layer has after deposition any thickness (e.g., 25 µm, 100 µm, 500 µm, 1000 µm, 5000 µm, 25,000 µm, etc.) and each layer has any thickness (e.g., 25 µm, 100 µm, 500 µm, 1000 µm, 5000 µm, 25,000 µm, etc.). Furthermore, it will be clear to those skilled in the art, after reading this disclosure, how to make and use alternative embodiments of the present invention in which one or more layers has a different thickness than one or more other layers.

In accordance with the second illustrative embodiment, the number of layers L in the fully-custom infill for article 151 is based on the thickness of article 151 (i.e., 4 cm. or 40,000 µm) and the thickness of each layer (i.e., 200 µm). In particular, the fully-custom infill for article 151, in accordance with the second illustrative embodiment, comprises:

$$L = \frac{40{,}000 \; \mu m}{200 \; \mu m} = 200 \text{ layers} \qquad (Eq. 5)$$

It will be clear to those skilled in the art, after reading this disclosure, how to make and use alternative embodiments of the present invention in which the fully-custom infill comprises any number of layers L.

Referring to FIG. 21, the Hexagonal Infill Layer E Archetype comprises one or more segments of filament (e.g., segment E1, segment E2, etc.) and each of the segments is serpentine in shape with bends of $\beta+\gamma$ radians. Furthermore, all of the segments in the Layer E layers are also serpentine (as shown in FIG. 31) with bends of $2\pi/3$ radians. It will be clear to those skilled in the art, after reading this disclosure how to make and use alternative embodiments of the present invention in which some or all of the segments in a Layer E layer comprise bends with different angles.

In FIG. 21 it can be seen that segment E1 passes through four volumes of space: V(2,1), V(3,2), V(4,2), and V(5,3), and segment E2 passes through four volumes of space V(1,3), V(2,4), V(3,4), and V(4,5).

Segment E1 is fused to and is parallel to the segment(s) that it touches, if any, within the volume of space V(2,1). Segment E1 is fused to and is parallel to the segment(s) that it touches, if any, within the volume of space V(3,2). Segment E1 is fused to and is parallel to the segment(s) that it touches, if any, within the volume of space V(4,2). Segment E1 is fused to and is parallel to the segment(s) that it touches, if any, within the volume of space V(5,3).

Segment E2 is fused to and is parallel to the segment(s) that it touches, if any, within the volume of space V(1,3). Segment E2 is fused to and is parallel to the segment(s) that it touches, if any, within the volume of space V(2,4). Segment E2 is fused to and is parallel to the segment(s) that it touches, if any, within the volume of space V(3,4). Segment E2 is fused to and is parallel to the segment(s) that it touches, if any, within the volume of space V(4,5).

Referring to FIG. 22, the Hexagonal Infill Layer F Archetype comprises one or more segments of filament (e.g., segment F1, segment F2, etc.) and each of the segments is serpentine in shape with bends of $\alpha+\gamma$ radians. Furthermore, all of the segments in the Layer F layers are also serpentine (as shown in FIG. 29) with bends of $2\pi/3$ radians. It will be clear to those skilled in the art, after reading this disclosure how to make and use alternative embodiments of the present invention in which some or all of the segments in a Layer F layer comprise bends with different angles.

In FIG. 22 it can be seen that segment F1 passes through four volumes of space: V(2,1), V(2,2), V(2,4), and V(2,5), and segment F2 passes through four volumes of space V(4,1), V(4,2), V(4,4), and V(4,5).

Segment F1 is fused to and is parallel to the segment(s) that it touches, if any, within the volume of space V(2,1). Segment F1 is fused to and is parallel to the segment(s) that it touches, if any, within the volume of space V(2,2). Segment F1 is fused to and is parallel to the segment(s) that it touches, if any, within the volume of space V(2,4). Segment F1 is fused to and is parallel to the segment(s) that it touches, if any, within the volume of space V(2,5).

Segment F2 is fused to and is parallel to the segment(s) that it touches, if any, within the volume of space V(4,1). Segment F2 is fused to and is parallel to the segment(s) that it touches, if any, within the volume of space V(4,2). Segment F2 is fused to and is parallel to the segment(s) that it touches, if any, within the volume of space V(4,4). Segment F2 is fused to and is parallel to the segment(s) that it touches, if any, within the volume of space V(4,5).

Referring to FIG. 23, the Hexagonal Infill Layer G Archetype comprises one or more segments of filament (e.g., segment G1, segment G2, etc.) and each of the segments is serpentine in shape with bends of α+β radians. Furthermore, all of the segments in the Layer G layers are also serpentine (as shown in FIG. 30) with bends of 2π/3 radians. It will be clear to those skilled in the art, after reading this disclosure how to make and use alternative embodiments of the present invention in which some or all of the segments in a Layer G layer comprise bends with different angles.

In FIG. 23 it can be seen that segment G1 passes through four volumes of space: V(4,1), V(3,2), V(2,2), and V(1,3), and segment G2 passes through four volumes of space V(5,3), V(4,4), V(3,4), and V(2,5).

Segment G1 is fused to and is parallel to the segment(s) that it touches, if any, within the volume of space V(4,1). Segment G1 is fused to and is parallel to the segment(s) that it touches, if any, within the volume of space V(3,2). Segment G1 is fused to and is parallel to the segment(s) that it touches, if any, within the volume of space V(2,2). Segment G1 is fused to and is parallel to the segment(s) that it touches, if any, within the volume of space V(2,5).

Segment G2 is fused to and is parallel to the segment(s) that it touches, if any, within the volume of space V(5,3). Segment G2 is fused to and is parallel to the segment(s) that it touches, if any, within the volume of space V(4,4). Segment G2 is fused to and is parallel to the segment(s) that it touches, if any, within the volume of space V(3,4). Segment G2 is fused to and is parallel to the segment(s) that it touches, if any, within the volume of space V(2,5).

Volumes of space V(2,1), V(4,1), V(2,2), V(3,2), V(4,2), V(1,3), V(5,3), V(2,4), V(3,4), V(4,4), V(2,5), and V(4,5) are disjoint (i.e., mutually exclusive).

Figure 24:
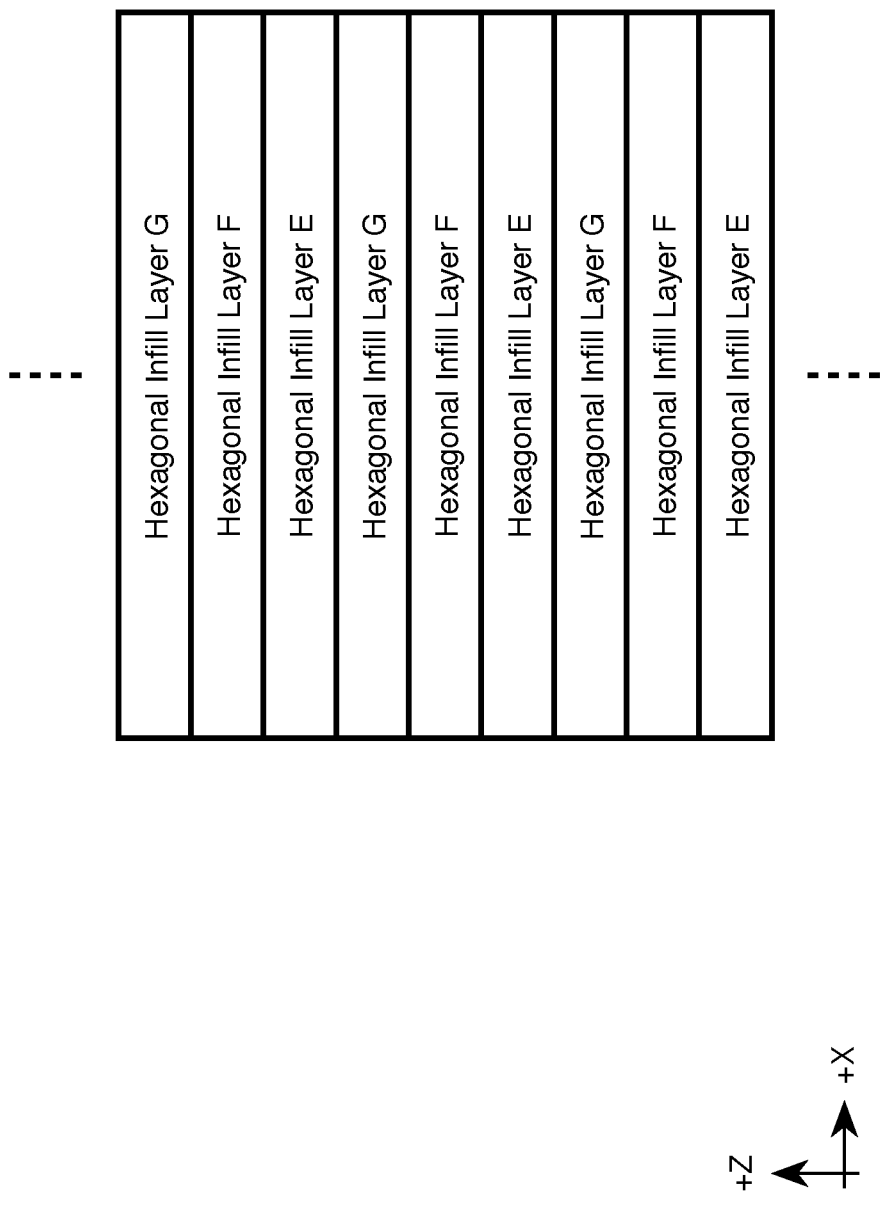
FIG. 24 depicts the order of depositing Hexagonal Infill Layer Archetypes in accordance with the second illustrative embodiment of the present invention.

Each of the L=200 layers in the fully-custom infill for article 151 is based on one of the three Hexagonal Infill Layer Archetypes. The second column in Table 2 and FIG. 24 depict which Layer Archetype is the basis for each layer in the fully-custom infill for article 151.

TABLE 2

Hexagonal Infill Archetype Layers at Each Layer for Fully-Custom Infill

| Layer L | Archetype Layer (First Illustrative Embodiment) | Archetype Layer (First Alternative Embodiment) | Archetype Layer (Second Alternative Embodiment) | Archetype Layer (Third Alternative Embodiment) |
|---|---|---|---|---|
| 200 | Layer E | Layer F | Layer E | Layer E |
| 199 | Layer G | Layer E | Layer G | Layer G |
| 198 | Layer F | Layer F | Layer F | Layer E |
| 197 | Layer E | Layer G | Layer G | Layer F |
| . | . | . | . | . |
| . | . | . | . | . |
| . | . | . | . | . |
| 9 | Layer G | Layer E | Layer F | Layer E |
| 8 | Layer F | Layer F | Layer G | Layer G |
| 7 | Layer E | Layer G | Layer E | Layer E |
| 6 | Layer G | Layer F | Layer F | Layer G |
| 5 | Layer F | Layer E | Layer E | Layer F |
| 4 | Layer E | Layer F | Layer E | Layer E |
| 3 | Layer G | Layer G | Layer G | Layer F |
| 2 | Layer F | Layer F | Layer F | Layer G |
| 1 | Layer E | Layer E | Layer E | Layer E |

Figure 25:
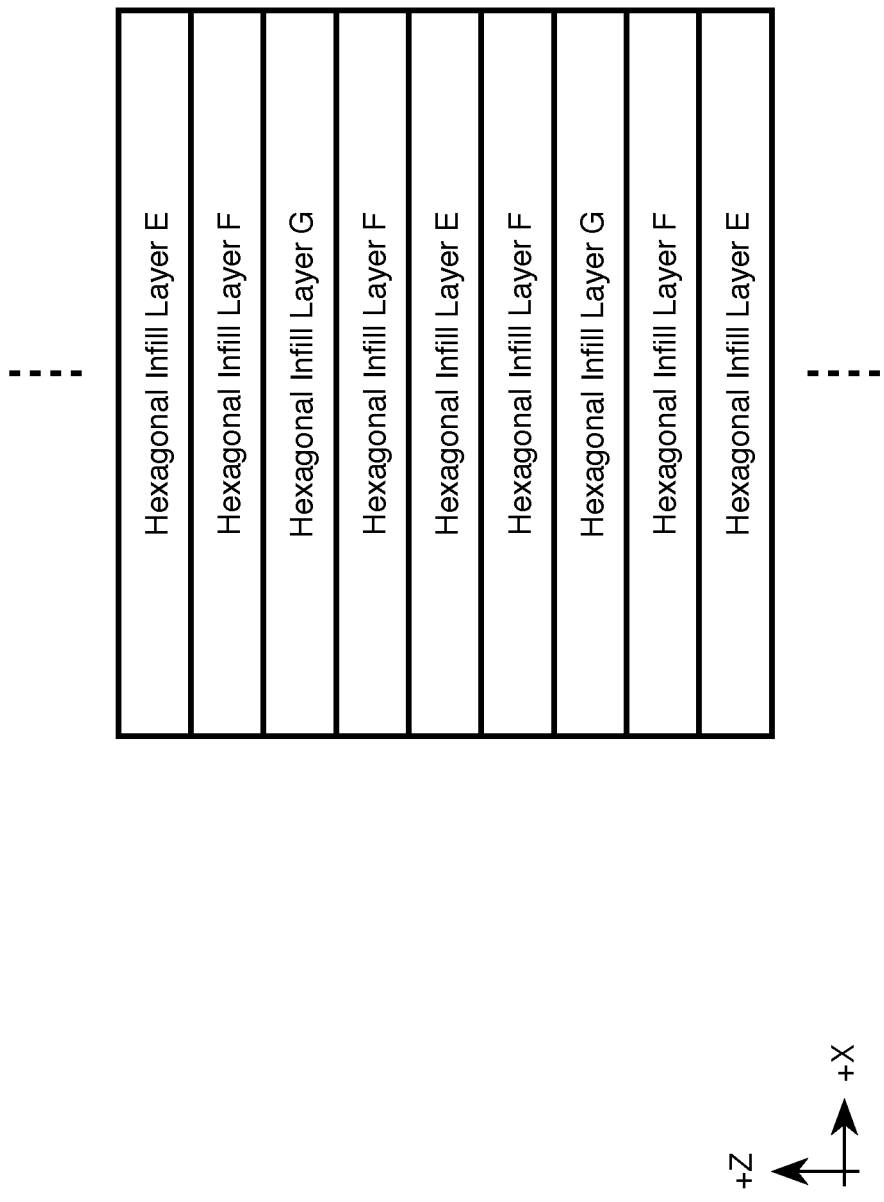
FIG. 25 depicts the order of depositing Hexagonal Infill Layer Archetypes in accordance with the second illustrative embodiment of the present invention.
Figure 26:
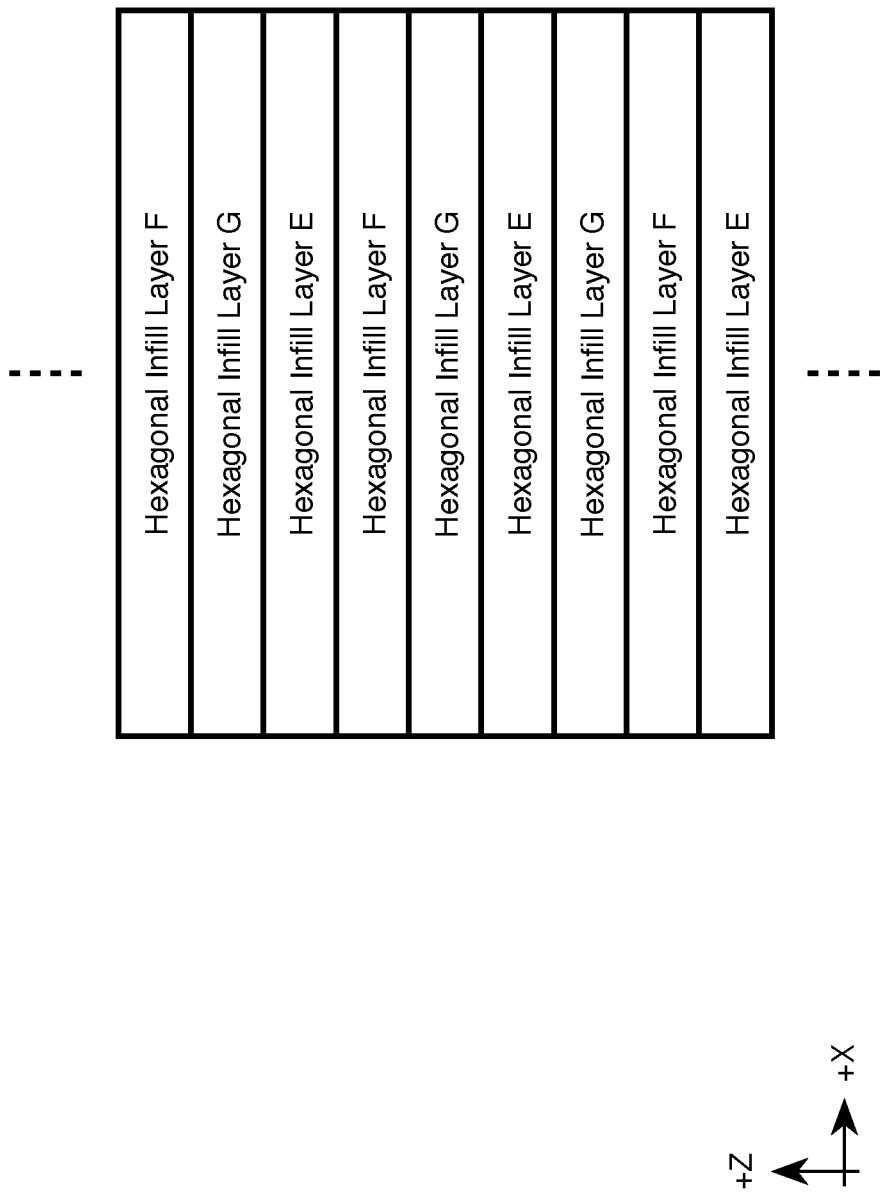
FIG. 26 depicts the order of depositing Hexagonal Infill Layer Archetypes in accordance with the second illustrative embodiment of the present invention.
Figure 27:
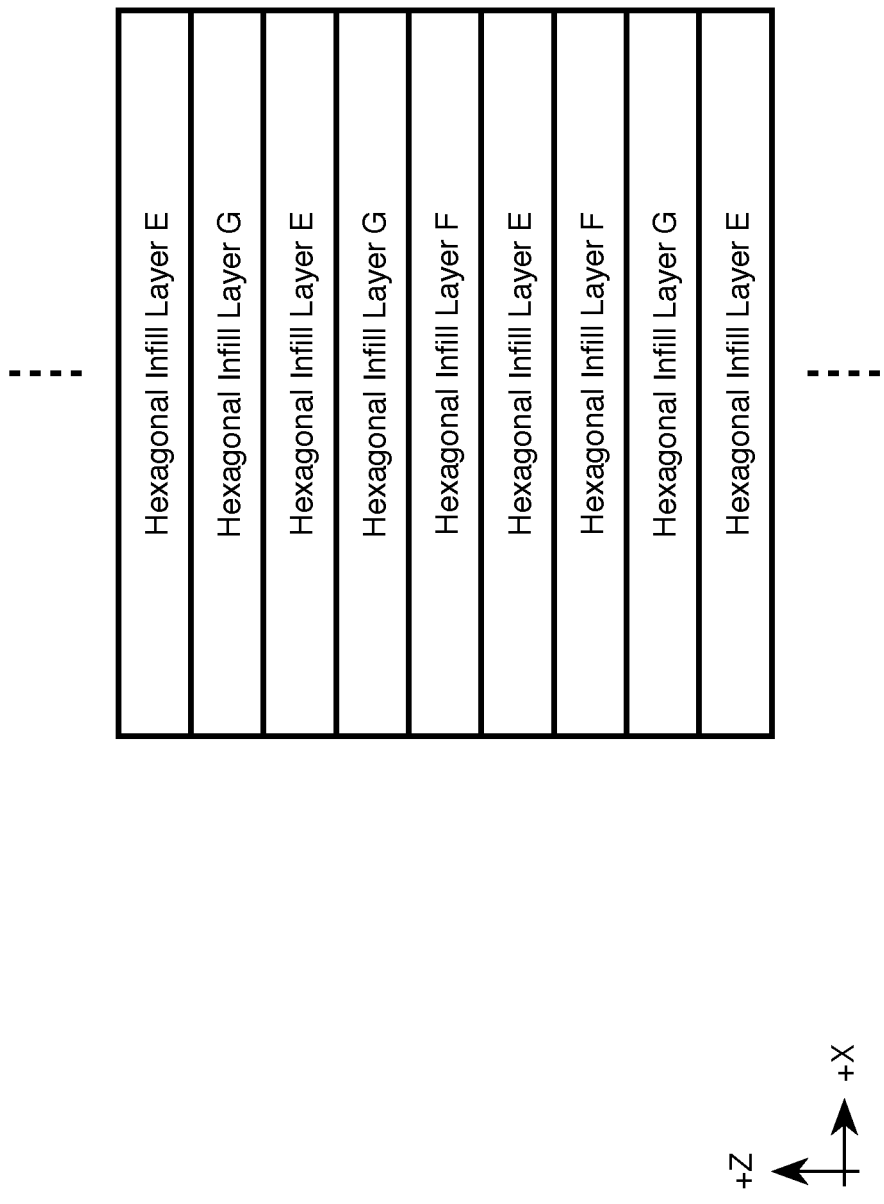
FIG. 27 depicts the order of depositing Hexagonal Infill Layer Archetypes in accordance with the second illustrative embodiment of the present invention.

The third column in Table 2 and FIG. 25 depict which Layer Archetype is the basis for each layer in a first alternative embodiment of the fully-custom infill for article 151. The fourth column in Table 2 and FIG. 26 depict which Layer Archetype is the basis for each layer in a second alternative embodiment of the fully-custom infill for article 151. The fifth column in Table 2 and FIG. 27 depict which Layer Archetype is the basis for each layer in a third alternative embodiment of the fully-custom infill for article 151. It will be clear to those skilled in the art, after reading this disclosure, which orders and combinations of layers are satisfactory and which orders and combinations of layers are not satisfactory.

Furthermore, it will be clear to those skilled in the art, after reading this disclosure, that the number of layers based on each archetype layer should be approximately equal:

$$N(E) \approx N(F) \approx N(G) \qquad \text{(Eq. 6)}$$

Where N(E) is the number of Layer E layers in the fully-custom infill, N(F) is the number of Layer F layers in the fully-custom infill, and N(G) is the number of Layer G layers in the fully-custom infill. It will be clear to those skilled in the art, after reading this disclosure, how to determine the effect that each of these deposition orders makes on the structural and other physical properties of article 151 as a whole.

FIG. 28 depicts an orthographic top view of the fully-custom infill of article 151 at cross-section AA-AA in accordance with the second illustrative embodiment, which is the top of layer L=200.

FIG. 29 depicts an orthographic top view of the segments in a Layer E layer in the fully-custom infill of article 151 in accordance with the second illustrative embodiment.

FIG. 30 depicts an orthographic top view of the segments in a Layer F layer in the fully-custom infill of article 151 in accordance with the second illustrative embodiment.

FIG. 31 depicts an orthographic top view of the segments in a Layer G layer in the fully-custom infill of article 151 in accordance with the second illustrative embodiment.

At task 203, the human designer and computer-aided-design system generate a tool path that produces article 151 with the fully-custom infill generated in task 202. It will be clear to those skilled in the art, after reading this disclosure, how to perform task 203.

At task 204, additive manufacturing system 100 fabricates article 151 in accordance with the tool path generated in task 203. It will be clear to those skilled in the art, after reading this disclosure, how to enable additive manufacturing system 100 to perform task 204.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An article of manufacture comprising a quadrilateral infill, the quadrilateral infill comprising:
   a first linear segment of filament (A1) that traverses in a straight line a volume of space V(1,2), a volume of space V(2,2), a volume of space V(3,2), a volume of space V(4,2), and a volume of space V(5,2);
   a second linear of filament (A2) that traverses in a straight line a volume of space V(1,4), a volume of space V(2,4), a volume of space V(3,4), a volume of space V(4,4), and a volume of space V(5,4);
   a third linear segment of filament (B1) that traverses in a straight line a volume of space V(2,1), the volume of space V(2,2), a volume of space V(2,3), the volume of space V(2,4), and a volume of space V(2,5), wherein:

(i) the third linear segment of filament (B1) is fused to the first linear segment of filament (A1) in the volume of space V(2,2), and (ii) the third linear segment of filament (B1) is fused to the second linear segment of filament (A2) in the volume of space V(2,4);

a fourth linear segment of filament (B2) that traverses in a straight line a volume of space V(4,1), the volume of space V(4,2), a volume of space V(4,3), the volume of space V(4,4), and a volume of space V(4,5), wherein:

(i) the fourth linear segment of filament (B2) is fused to the first linear segment of filament (A1) in the volume of space V(4,2), and (ii) the fourth linear segment of filament (B2) is fused to the second linear segment of filament (A2) in the volume of space V(4,4);

a fifth linear segment of filament (C2) that exists in the volume of space V(1,4), the volume of space V(2,3), the volume of space V(3,2), and the volume of space V(4,1), wherein:

(i) the fifth linear segment of filament (C2) is fused to and parallel to the second linear segment of filament (A2) in the volume of space V(1,4), and (ii) the fifth linear segment of filament (C2) is fused to and parallel to the third linear segment of filament (B1) in the volume of space V(2,3), and (iii) the fifth linear segment of filament (C2) is fused to and parallel to the first linear segment of filament (A1) in the volume of space V(3,2), and (iv) the fifth linear segment of filament (C2) is fused to and parallel to the fourth linear segment of filament (B2) in the volume of space V(4,1); and a sixth linear segment of filament (C3) that exists in the volume of space V(2,5), the volume of space V(3,4), the volume of space V(4,3), and the volume of space V(5,2), wherein:

(i) the sixth linear segment of filament (C3) is fused to and parallel to the third linear segment of filament (B1) in the volume of space V(2,5), and (ii) the sixth linear segment of filament (C3) is fused to and parallel to the second linear segment of filament (A2) in the volume of space V(3,4), and (iii) the sixth linear segment of filament (C3) is fused to and parallel to the fourth linear segment of filament (B2) in the volume of space V(4,3), and (iv) the sixth linear segment of filament (C3) is fused to and parallel to the first linear segment of filament (A1) in the volume of space V(5,2);

wherein the volume of space V(1,2), the volume of space V(1,4), the volume of space V(2,1), the volume of space V(2,2), the volume of space V(2,3), the volume of space V(2,4), the volume of space V(2,5), the volume of space V(3,2), the volume of space V(3,4), and a volume of space V(4,1), the volume of space V(4,2), the volume of space V(4,3), the volume of space V(4,4), the volume of space V(4,5), the volume of space V(5,2), and the volume of space V(5,4) are disjoint.

2. The article of manufacture of claim 1 further comprising:

a seventh linear segment of filament (C1) that traverses a volume of space V(1,2) and the volume of space V(2,1), wherein:

(i) the seventh linear segment of filament (C1) is fused to and parallel to the first linear segment of filament (A1) in the volume of space V(1,2), and (ii) the seventh linear segment of filament (C1) is fused to and parallel to the third linear segment of filament (B1) in the volume of space V(2,1);

an eighth linear segment of filament (C4) that traverses a volume of space V(4,5) and the volume of space V(5,4), wherein:

(i) the eighth linear segment of filament (C4) is fused to and parallel to the fourth linear segment of filament (B2) in the volume of space V(4,5), and (ii) the eighth linear segment of filament (C4) is fused to and parallel to the second linear segment of filament (A2) in the volume of space V(5,4).

3. The article of manufacture of claim 2 further comprising:

a ninth linear segment of filament (D2) that exists in the volume of space V(1,4), the volume of space V(2,3), the volume of space V(3,4), and the volume of space V(4,5), wherein:

(i) the ninth linear segment of filament (D2) is fused to and parallel to the seventh linear segment of filament (C1) in the volume of space V(1,2), and (ii) the ninth linear segment of filament (D2) is fused to and parallel to the fifth linear segment of filament (C2) in the volume of space V(2,3), and (iii) the ninth linear segment of filament (D2) is fused to and parallel to the sixth linear segment of filament (C3) in the volume of space V(3,4), and (iv) the ninth linear segment of filament (D2) is fused to and parallel to the eighth linear segment of filament (C4) in the volume of space V(4,5); and a tenth linear segment of filament (D3) that exists in the volume of space V(2,1), the volume of space V(3,2), the volume of space V(4,3), and the volume of space V(5,4), wherein:

(i) the tenth linear segment of filament (D3) is fused to and parallel to the seventh linear segment of filament (C1) in the volume of space V(2,1), and (ii) the tenth linear segment of filament (D3) is fused to and parallel to the fifth linear segment of filament (C2) in the volume of space V(3,2), and (iii) the tenth linear segment of filament (D3) is fused to and parallel to the sixth linear segment of filament (C3) in the volume of space V(4,3), and (iv) the tenth linear segment of filament (D3) is fused to and parallel to the eighth linear segment of filament (C4) in the volume of space V(5,4).

4. The article of manufacture of claim 1 further comprising:

a seventh linear segment of filament (D2) that exists in the volume of space V(1,4), the volume of space V(2,3), the volume of space V(3,4), and the volume of space V(4,5), wherein:

(i) the seventh linear segment of filament (D2) is fused to and parallel to the first linear segment of filament (A1) in the volume of space V(1,2), and (ii) the seventh linear segment of filament (D2) is fused to and parallel to the third linear segment of filament (B1) in the volume of space V(2,3), and (iii) the seventh linear segment of filament (D2) is fused to and parallel to the second linear segment of filament (A2) in the volume of space V(3,4), and (iv) the seventh linear segment of filament (D2) is fused to and parallel to the fourth linear segment of filament (B2) in the volume of space V(4,5); and an eighth linear segment of filament (D3) that exists in the volume of space V(2,1), the volume of space V(3,2), the volume of space V(4,3), and the volume of space V(5,4), wherein:
- (i) the eighth linear segment of filament (D3) is fused to and parallel to the third linear segment of filament (B1) in the volume of space V(2,1), and
- (ii) the eighth linear segment of filament (D3) is fused to and parallel to the first linear segment of filament (A1) in the volume of space V(3,2), and
- (iii) the eighth linear segment of filament (D3) is fused to and parallel to the fourth linear segment of filament (B2) in the volume of space V(4,3), and
- (iv) the eighth linear segment of filament (D3) is fused to and parallel to the second linear segment of filament (A2) in the volume of space V(5,4).

5. The article of manufacture of claim 1 wherein the fifth linear segment of filament (C2) comprises a bend between the volume of space V(2,3) and the volume of space V(3,2); and
wherein the bend has a radius that is greater than or equal to one-half of a length of bump p exhibited by the first linear segment of filament (A1) and the third linear segment of filament (B1).

6. The article of manufacture of claim 1 wherein the first linear segment of filament is continuous fiber-reinforced filament.

7. The article of manufacture of claim 1 wherein the first linear segment of filament is continuous carbon-fiber-reinforced filament.

8. An article of manufacture comprising a quadrilateral infill, the quadrilateral infill comprising:
a first linear segment of filament (C2) that exists in a volume of space V(1,4), a volume of space V(2,3), a volume of space V(3,2), and a volume of space V(4,1);
a second linear segment of filament (C3) that exists in a volume of space V(2,5), a volume of space V(3,4), a volume of space V(4,3), and a volume of space V(5,2);
a third linear segment of filament (A1) that traverses in a straight line a volume of space V(1,2), a volume of space V(2,2), the volume of space V(3,2), a volume of space V(4,2), and a volume of space V(5,2), wherein:
- (i) the third linear segment of filament (A1) is fused to and parallel to the first linear segment of filament (C2) in the volume of space V(3,2), and
- (ii) the third linear segment of filament (A1) is fused to and parallel to the second linear segment of filament (C3) in the volume of space V(5,2);

a fourth linear segment of filament (A2) that traverses in a straight line the volume of space V(1,4), a volume of space V(2,4), the volume of space V(3,4), a volume of space V(4,4), and the volume of space V(5,4), wherein:
- (i) the fourth linear segment of filament (A2) is fused to and parallel to the first linear segment of filament (C2) in the volume of space V(1,4), and
- (ii) the fourth linear segment of filament (A2) is fused to and parallel to the second linear segment of filament (C3) in the volume of space V(3,4);

a fifth linear segment of filament (D2) that traverses the volume of space V(1,2), the volume of space V(2,3), the volume of space V(3,4), and a volume of space V(4,5), wherein:
- (i) the fifth linear segment of filament (D2) is fused to and parallel to the third linear segment of filament (A1) in the volume of space V(1,2), and
- (ii) the fifth linear segment of filament (D2) is fused to and parallel to the first linear segment of filament (C2) in the volume of space V(2,3), and
- (iii) the fifth linear segment of filament (D2) is fused to and parallel to the fourth linear segment of filament (A2) in the volume of space V(3,4);

a sixth linear segment of filament (D3) that traverses a volume of space V(2,1), the volume of space V(3,2), the volume of space V(4,3), and the volume of space V(5,4), wherein:
- (i) the sixth linear segment of filament (D3) is fused to and parallel to the third linear segment of filament (A1) in the volume of space V(3,2), and
- (ii) the sixth linear segment of filament (D3) is fused to and parallel to the second linear segment of filament (C2) in the volume of space V(4,3), and
- (iii) the sixth linear segment of filament (D3) is fused to and parallel to the fourth linear segment of filament (A2) in the volume of space V(5,4); and a seventh linear segment of filament (B2) that traverses in a straight line the volume of space V(4,1), the volume of space V(4,2), the volume of space V(4,3), the volume of space V(4,4), and the volume of space V(4,5), wherein:
- (i) the seventh linear segment of filament (B2) is fused to the third linear segment of filament (A1) in the volume of space V(4,2), and
- (ii) the seventh linear segment of filament (B2) is fused to and parallel to the sixth linear segment of filament (D3) in the volume of space V(4,3), and
- (iii) the seventh linear segment of filament (B2) is fused to the fourth linear segment of filament (A2) in the volume of space V(4,4), and
- (iv) the seventh linear segment of filament (B2) is fused to and parallel to the fifth linear segment of filament (D2) in the volume of space V(4,5);

wherein the volume of space V(1,2), the volume of space V(1,4), the volume of space V(2,1), the volume of space V(2,2), the volume of space V(2,3), the volume of space V(2,4), the volume of space V(2,5), the volume of space V(3,2), the volume of space V(3,4), and a volume of space V(4,1), the volume of space V(4,2), the volume of space V(4,3), the volume of space V(4,4), the volume of space V(4,5), the volume of space V(5,2), and the volume of space V(5,4) are disjoint.

9. The article of manufacture of claim 8 further comprising:
an eighth linear segment of filament (A1) that traverses in a straight line a volume of space V(1,2), a volume of space V(2,2), the volume of space V(3,2), a volume of space V(4,2), and a volume of space V(5,2), wherein:
- (ii) the eighth linear segment of filament (A1) is fused to and parallel to the first linear segment of filament (C2) in the volume of space V(3,2); and a ninth linear segment of filament (A2) that traverses in a straight line the volume of space V(1,4), a volume of space V(2,4), the volume of space V(3,4), a volume of space V(4,4), and the volume of space V(5,4), wherein:
- (i) the ninth linear segment of filament (A2) is fused to and parallel to the second linear segment of filament (C3) in the volume of space V(3,4).

10. The article of manufacture of claim 8 further comprising:
an eighth linear segment of filament (31) that traverses in a straight line the volume of space V(2,1), the volume of space V(2,2), the volume of space V(2,3), the volume of space V(2,4), and the volume of space V(2,5), wherein:
- (i) the eighth linear segment of filament (31) is fused to and parallel to the sixth linear segment of filament (D3) in the volume of space V(2,1), and
- (ii) the eighth linear segment of filament (31) is fused to the third linear segment of filament (A1) in the volume of space V(2,2), and
- (iii) the eighth linear segment of filament (31) is fused to and parallel to the fifth linear segment of filament (D2) in the volume of space V(2,3), and
- (iv) the eighth linear segment of filament (31) is fused to the fourth linear segment of filament (A2) in the volume of space V(2,4).

11. The article of manufacture of claim 8 wherein the first linear segment of filament (C2) is continuous fiber-reinforced filament.

12. The article of manufacture of claim 8 wherein the first linear segment of filament (C2) is continuous carbon-fiber-reinforced filament.

13. The article of manufacture of claim 10 wherein the first linear segment of filament (C2) comprises a bend between the volume of space V(2,3) and the volume of space V(3,2); and
wherein the bend has a radius that is greater than or equal to one-half of a length of bump p exhibited by the third linear segment of filament (A1) and the eighth linear segment of filament (B1).

14. An article of manufacture comprising a quadrilateral infill, the quadrilateral infill comprising:
a first linear segment of filament (A1) that traverses in a straight line a volume of space V(1,2), a volume of space V(2,2), a volume of space V(3,2), a volume of space V(4,2), and a volume of space V(5,2);
a second linear segment of filament (A2) that traverses in a straight line a volume of space V(1,4), a volume of space V(2,4), a volume of space V(3,4), a volume of space V(4,4), and a volume of space V(5,4);
a third linear segment of filament (B1) that traverses in a straight line a volume of space V(2,1), the volume of space V(2,2), a volume of space V(2,3), the volume of space V(2,4), and a volume of space V(2,5), wherein:
- (i) the third linear segment of filament (B1) is fused to the first linear segment of filament (A1) in the volume of space V(2,2), and
- (ii) the third linear segment of filament (B1) is fused to the second linear segment of filament (A2) in the volume of space V(2,4);

a fourth linear segment of filament (B2) that traverses in a straight line a volume of space V(4,1), the volume of space V(4,2), a volume of space V(4,3), the volume of space V(4,4), and a volume of space V(4,5), wherein:
- (i) the fourth linear segment of filament (B2) is fused to the first linear segment of filament (A1) in the volume of space V(4,2), and
- (ii) the fourth linear segment of filament (B2) is fused to the second linear segment of filament (A2) in the volume of space V(4,4);

a fifth linear segment of filament (A1) that traverses in a straight line the volume of space V(1,2), the volume of space V(2,2), the volume of space V(3,2), the volume of space V(4,2), and the volume of space V(5,2), wherein:
- (i) the fifth linear segment of filament (A1) is fused to and parallel to the first linear segment of filament (A1) in the volume of space V(1,2), and
- (ii) the fifth linear segment of filament (A1) is fused to the third linear segment of filament (B1) in the volume of space V(2,2), and
- (iii) the fifth linear segment of filament (A1) is fused to and parallel to the first linear segment of filament (A1) in the volume of space V(3,2), and
- (iv) the fifth linear segment of filament (A1) is fused to the fourth linear segment of filament (B2) in the volume of space V(4,2), and
- (v) the fifth linear segment of filament (A1) is fused to and parallel to the first linear segment of filament (A1) in the volume of space V(5,2); and a sixth linear segment of filament (A2) that traverses in a straight line the volume of space V(1,4), the volume of space V(2,4), the volume of space V(3,4), the volume of space V(4,4), and the volume of space V(5,4), wherein:
- (i) the sixth linear segment of filament (A2) is fused to and parallel to the second linear segment of filament (A2) in the volume of space V(1,4), and
- (ii) the sixth linear segment of filament (A2) is fused to the third linear segment of filament (B1) in the volume of space V(2,4), and
- (iii) the sixth linear segment of filament (A2) is fused to and parallel to the second linear segment of filament (A2) in the volume of space V(3,4), and
- (iv) the sixth linear segment of filament (A2) is fused to the fourth linear segment of filament (B2) in the volume of space V(4,4), and
- (v) the sixth linear segment of filament (A2) is fused to and parallel to the second linear segment of filament (A2) in the volume of space V(5,4), wherein the volume of space V(1,2), the volume of space V(1,4), the volume of space V(2,1), the volume of space V(2,2), the volume of space V(2,3), the volume of space V(2,4), the volume of space V(2,5), the volume of space V(3,2), the volume of space V(3,4), and a volume of space V(4,1), the volume of space V(4,2), the volume of space V(4,3), the volume of space V(4,4), the volume of space V(4,5), the volume of space V(5,2), and the volume of space V(5,4) are disjoint.

15. The article of manufacture of claim 14 further comprising:
a seventh linear segment of filament (C2) that exists in the volume of space V(1,4), the volume of space V(2,3), the volume of space V(3,2), and the volume of space V(4,1), wherein:
- (i) the seventh linear segment of filament (C2) is fused to and parallel to the second linear segment of filament (A2) in the volume of space V(1,4), and
- (ii) the seventh linear segment of filament (C2) is fused to and parallel to the third linear segment of filament (B1) in the volume of space V(2,3), and
- (iii) the seventh linear segment of filament (C2) is fused to and parallel to the first linear segment of filament (A1) in the volume of space V(3,2), and
- (iv) the seventh linear segment of filament (C2) is fused to and parallel to the fourth linear segment of filament (B2) in the volume of space V(4,1); and an eighth linear segment of filament (C3) that exists in the volume of space V(2,5), the volume of space V(3,4), the volume of space V(4,3), and the volume of space V(5,2), wherein:
- (i) the eighth linear segment of filament (C3) is fused to and parallel to the third linear segment of filament (B1) in the volume of space V(2,5), and (ii) the eighth linear segment of filament (C3) is fused to and parallel to the second linear segment of filament (A2) in the volume of space V(3,4), and (iii) the eighth linear segment of filament (C3) is fused to and parallel to the fourth linear segment of filament (B2) in the volume of space V(4,3), and (iv) the eighth linear segment of filament (C3) is fused to and parallel to the first linear segment of filament (A1) in the volume of space V(5,2).

16. The article of manufacture of claim 15 further comprising:

a ninth linear segment of filament (C2) that exists in the volume of space V(1,4), the volume of space V(2,3), the volume of space V(3,2), and the volume of space V(4,1), wherein:

(i) the ninth linear segment of filament (C2) is fused to and parallel to the sixth linear segment of filament (A2) in the volume of space V(1,4), and (ii) the ninth linear segment of filament (C2) is fused to and parallel to the third linear segment of filament (B1) in the volume of space V(2,3), and (iii) the ninth linear segment of filament (C2) is fused to and parallel to the fifth linear segment of filament (A1) in the volume of space V(3,2), and (iv) the ninth linear segment of filament (C2) is fused to and parallel to the fourth linear segment of filament (B2) in the volume of space V(4,1); and a tenth linear segment of filament (C3) that exists in the volume of space V(2,5), the volume of space V(3,4), the volume of space V(4,3), and the volume of space V(5,2), wherein:

(i) the tenth linear segment of filament (C3) is fused to and parallel to the third linear segment of filament (B1) in the volume of space V(2,5), and (ii) the tenth linear segment of filament (C3) is fused to and parallel to the sixth linear segment of filament (A2) in the volume of space V(3,4), and (iii) the tenth linear segment of filament (C3) is fused to and parallel to the fourth linear segment of filament (B2) in the volume of space V(4,3), and (iv) the tenth linear segment of filament (C3) is fused to and parallel to the fifth linear segment of filament (A1) in the volume of space V(5,2).

17. The article of manufacture of claim 14 wherein the first linear segment of filament (A1) and the third linear segment of filament (B1) are at different infill layers, and wherein the first linear segment of filament (A1) and the fourth linear segment of filament (B2) are at different infill layers.

18. The article of manufacture of claim 16 further comprising:

an eleventh linear segment of filament (D2) that exists in the volume of space V(1,2), the volume of space V(2,3), the volume of space V(3,4), and the volume of space V(4,5), wherein:

(i) the eleventh linear segment of filament (D2) is fused to and parallel to the fifth linear segment of filament (A1) in the volume of space V(1,2), and (ii) the eleventh linear segment of filament (D2) is fused to and parallel to the ninth linear segment of filament (C2) in the volume of space V(2,3), and (iii) the eleventh linear segment of filament (D2) is fused to and parallel to the tenth linear segment of filament (C3) in the volume of space V(3,4), and (iv) the eleventh linear segment of filament (D2) is fused to and parallel to the fourth linear segment of filament (B2) in the volume of space V(4,5); and a twelfth linear segment of filament (D3) that exists in the volume of space V(2,1), the volume of space V(3,2), the volume of space V(4,3), and the volume of space V(5,4), wherein:

(i) the twelfth linear segment of filament (D3) is fused to and parallel to the third linear segment of filament (B1) in the volume of space V(2,1), and (ii) the twelfth linear segment of filament (D3) is fused to and parallel to the ninth linear segment of filament (C2) in the volume of space V(3,2), and (iii) the twelfth linear segment of filament (D3) is fused to and parallel to the tenth linear segment of filament (C3) in the volume of space V(4,3), and (iv) the twelfth linear segment of filament (D3) is fused to and parallel to the sixth linear segment of filament (A2) in the volume of space V(5,4).

19. The article of manufacture of claim 14 wherein the first linear segment of filament (A1) and the fifth linear segment of filament (A1) are at the same infill layer.

20. The article of manufacture of claim 14 wherein the pitch p(A) between the first linear segment of filament (A1) and the second linear segment of filament (A2) does not equal the pitch p(B) between the third linear segment of filament (B1) and the fourth linear segment of filament (B2).

* * * * *